Aug. 4, 1942.　　　　G. M. DYE　　　　2,291,613
PROJECTION PRINTER
Filed Nov. 7, 1938　　　　14 Sheets-Sheet 1

Inventor
GLEN M. DYE
BY
Attorney

Aug. 4, 1942.　　　　G. M. DYE　　　　2,291,613
PROJECTION PRINTER
Filed Nov. 7, 1938　　　14 Sheets-Sheet 3

Inventor
GLEN M. DYE
By
Attorney

Aug. 4, 1942.　　　　G. M. DYE　　　　2,291,613
PROJECTION PRINTER
Filed Nov. 7, 1938　　　14 Sheets-Sheet 5

Inventor
GLEN M. DYE
BY Chas. E. Rey
Attorney

Aug. 4, 1942.　　　　G. M. DYE　　　　2,291,613
PROJECTION PRINTER
Filed Nov. 7, 1938　　　14 Sheets-Sheet 6

Inventor
GLEN M. DYE
BY
Attorney

Aug. 4, 1942.     G. M. DYE     2,291,613
PROJECTION PRINTER
Filed Nov. 7, 1938     14 Sheets-Sheet 7
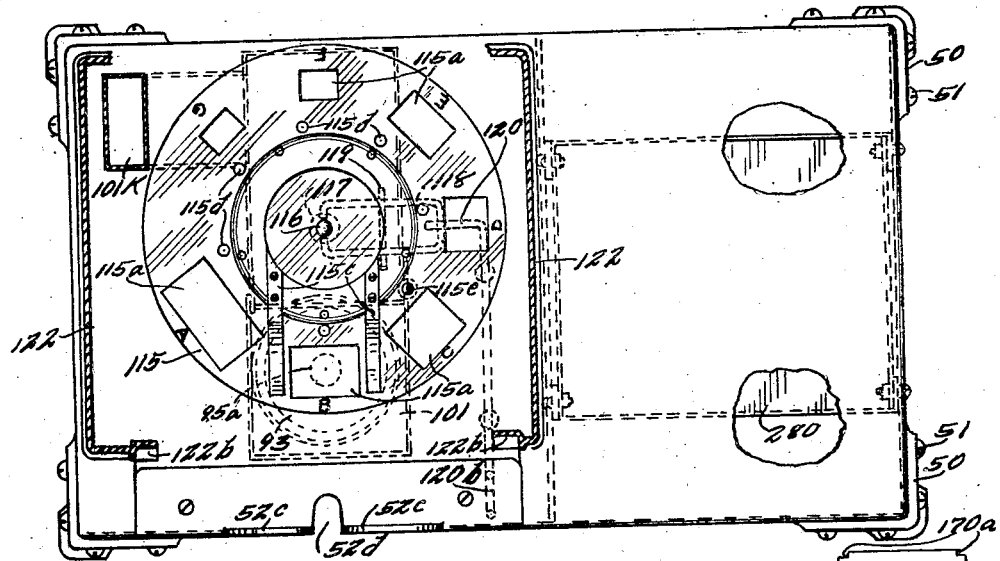
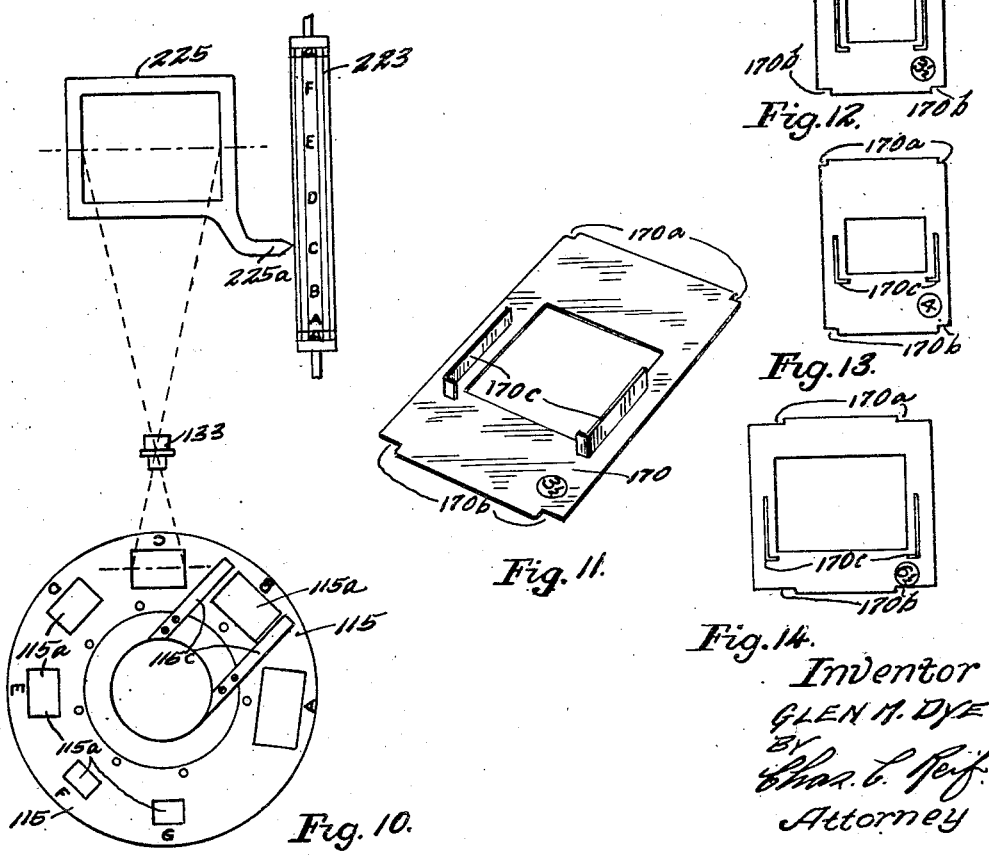
Inventor
GLEN M. DYE
By
Chas. C. Reif
Attorney Aug. 4, 1942.    G. M. DYE    2,291,613
PROJECTION PRINTER
Filed Nov. 7, 1938    14 Sheets-Sheet 8
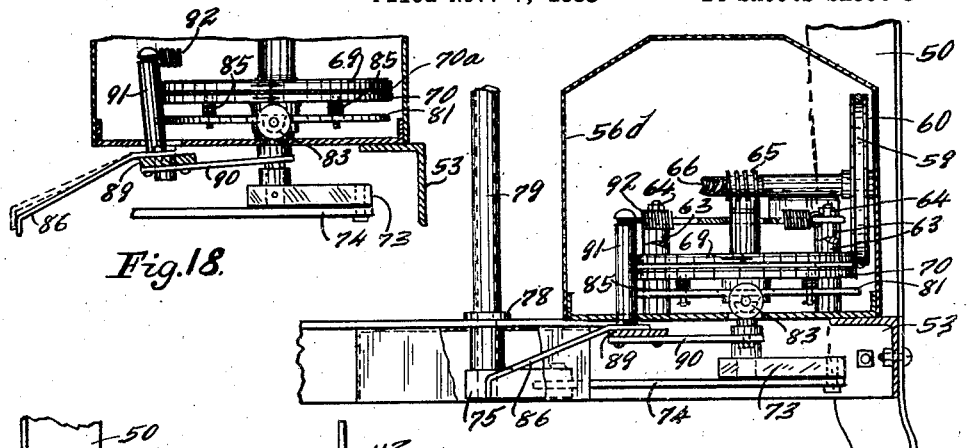
Fig. 18.
Fig. 17.
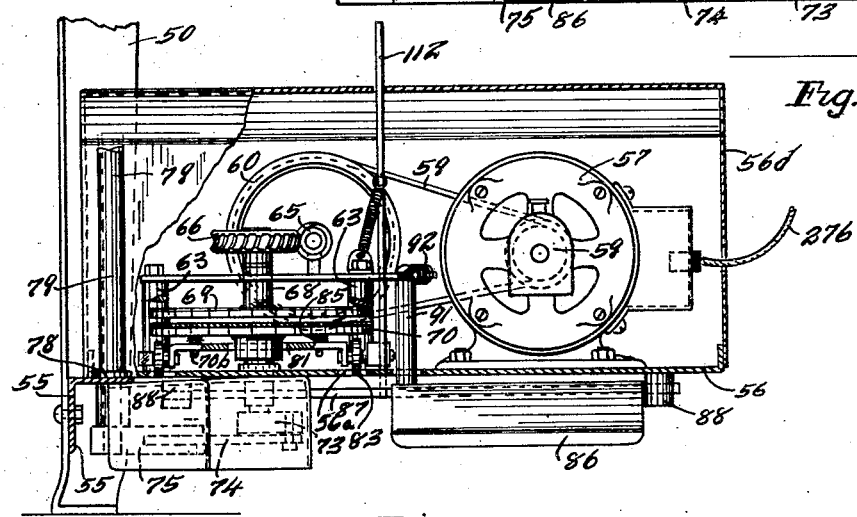
Fig. 15.
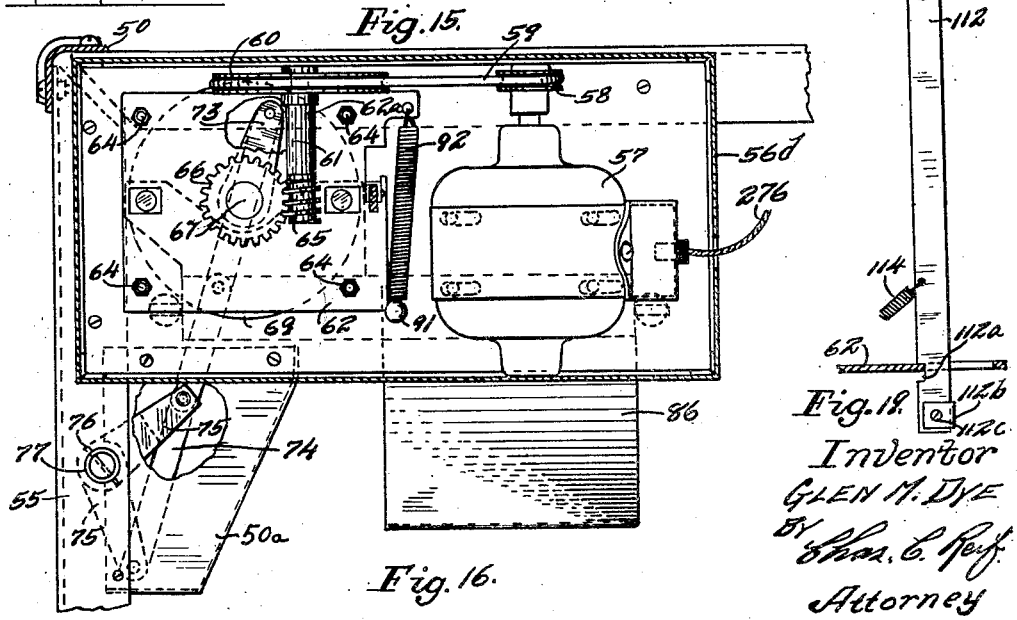
Fig. 16.
Fig. 18.
Inventor
GLEN M. DYE
By Thos. C. Reif
Attorney

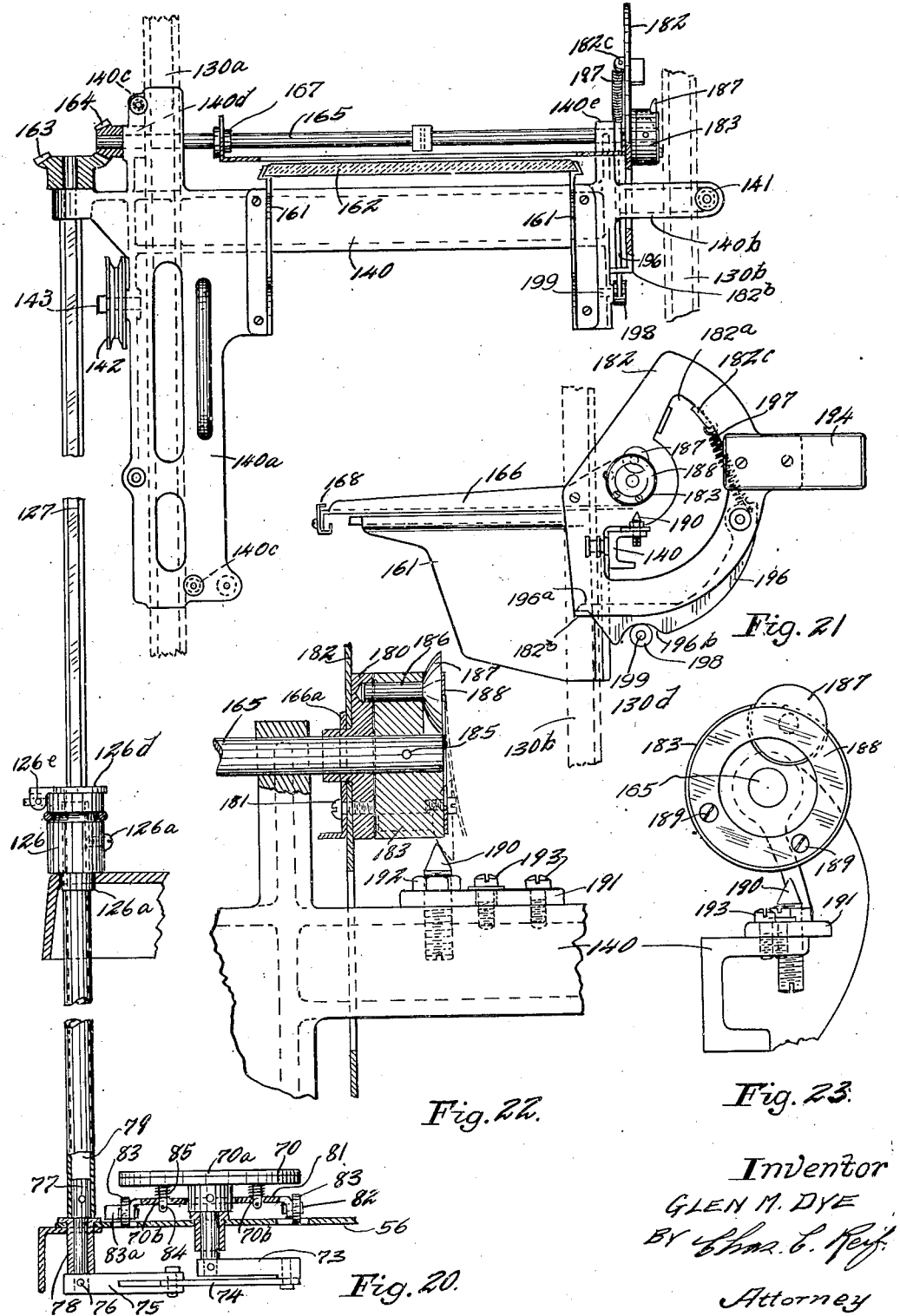

Aug. 4, 1942.　　　　G. M. DYE　　　　2,291,613
PROJECTION PRINTER
Filed Nov. 7, 1938　　　14 Sheets-Sheet 11
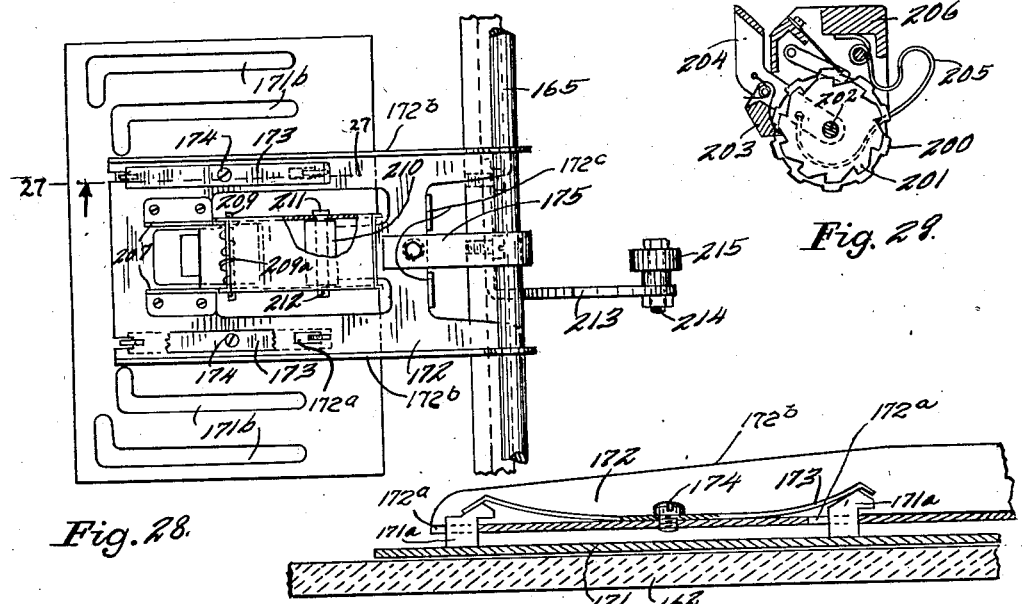
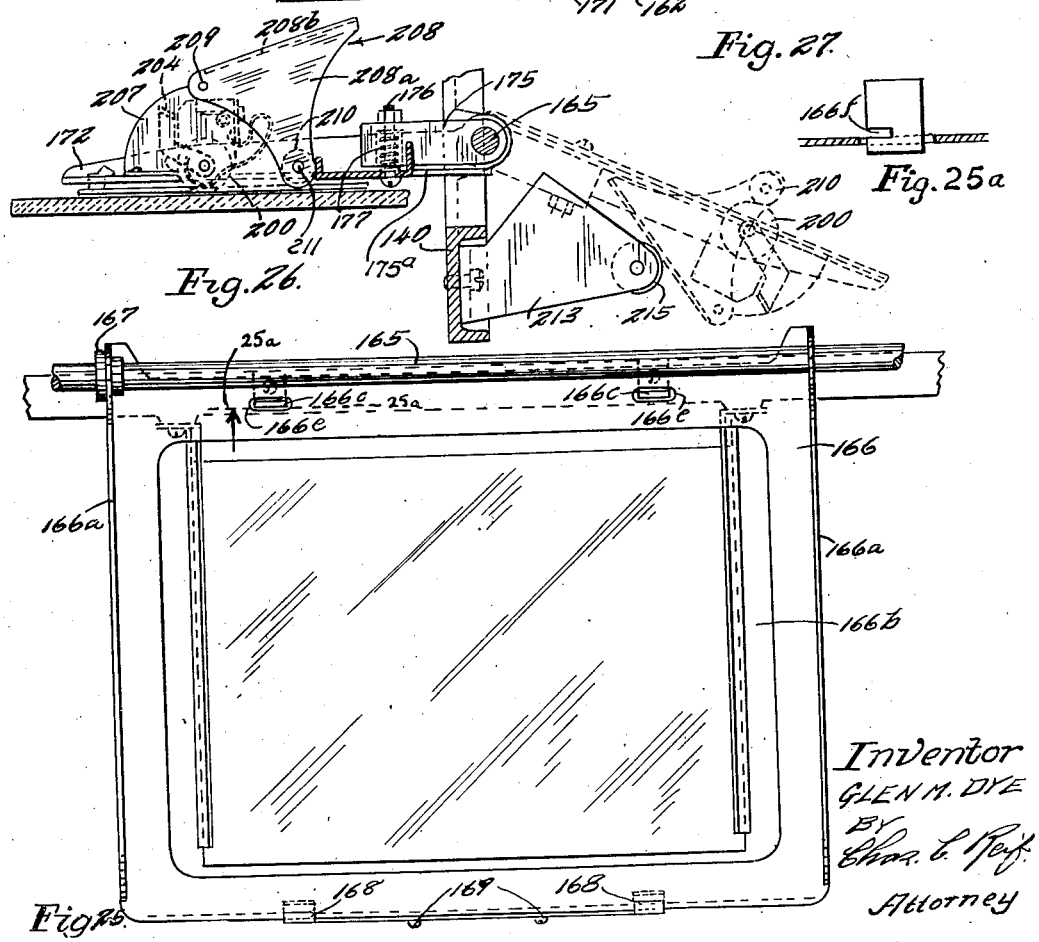
Inventor
GLEN M. DYE
By
Chas. C. Rex
Attorney

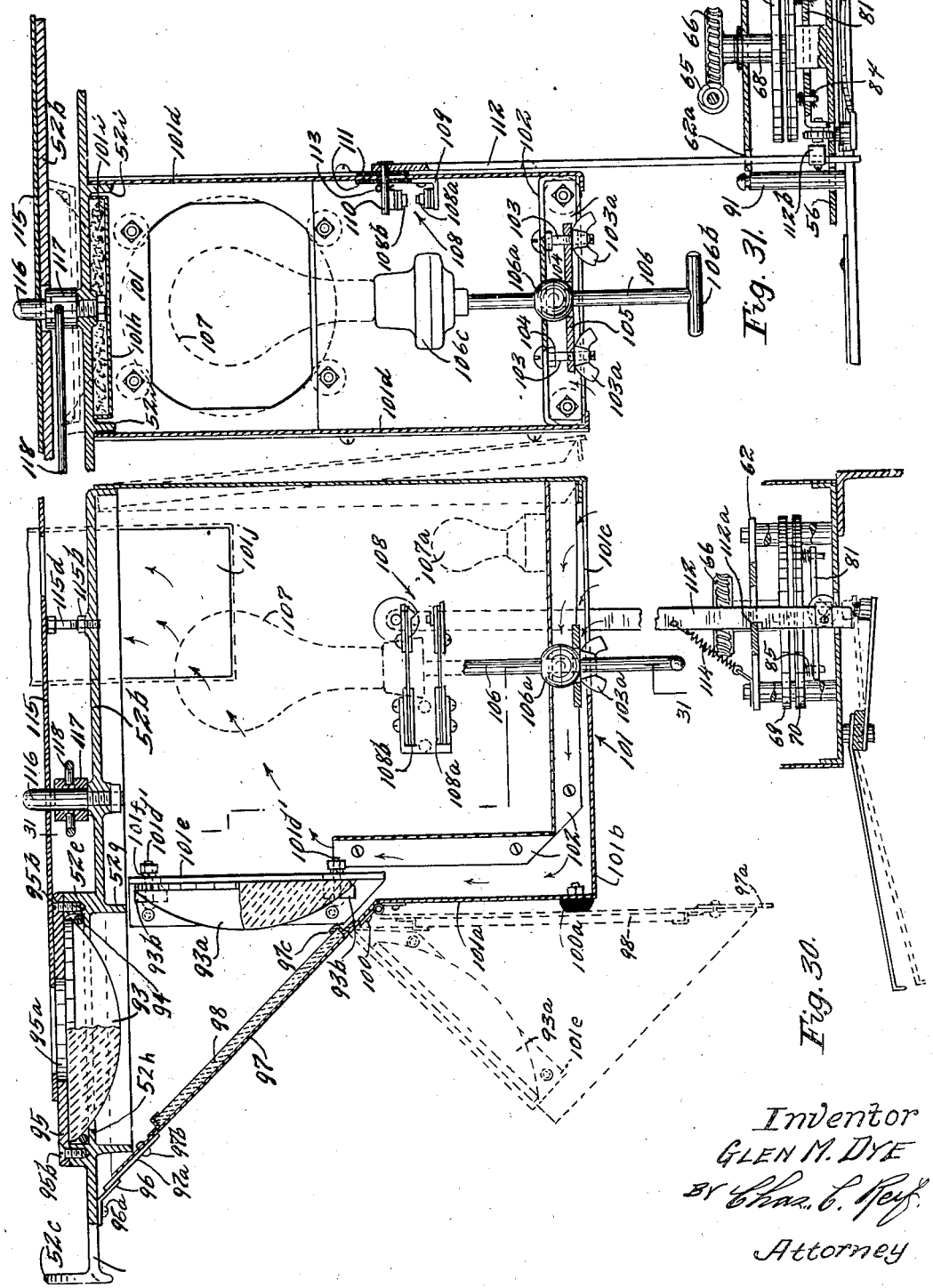

Aug. 4, 1942.                G. M. DYE                  2,291,613
                         PROJECTION PRINTER
                        Filed Nov. 7, 1938         14 Sheets-Sheet 13

Inventor
GLEN M. DYE
BY
Attorney

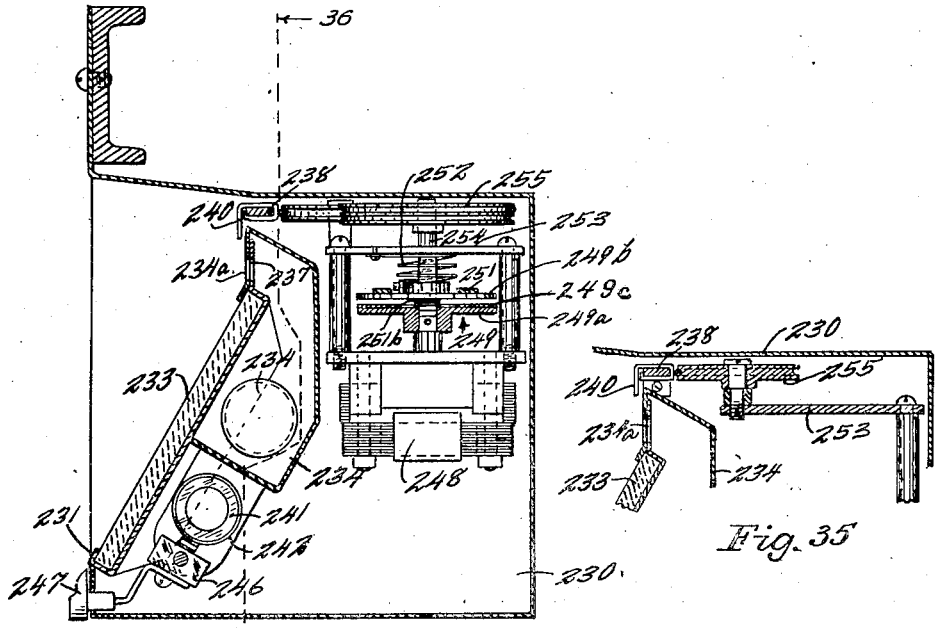
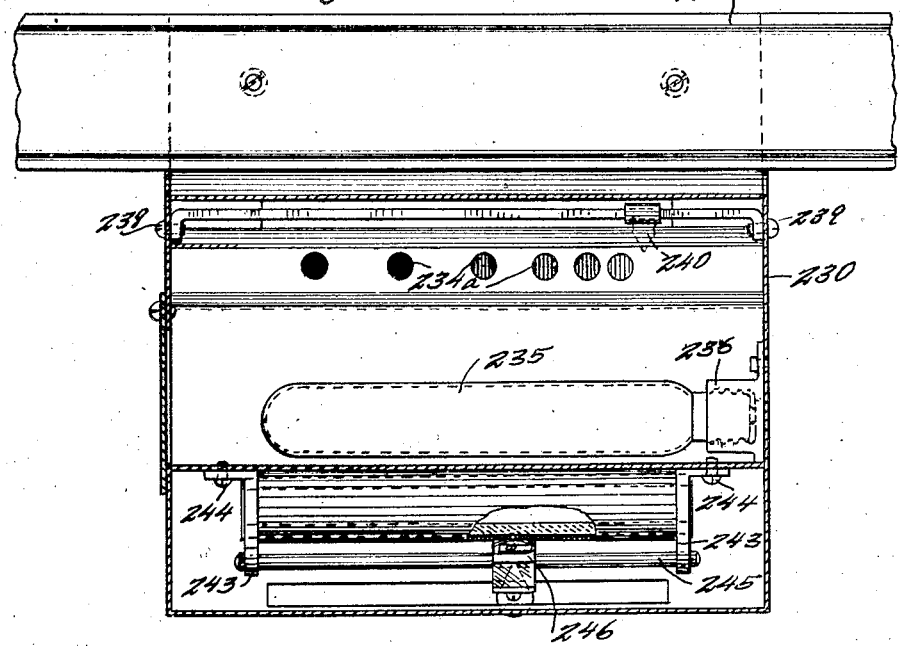

Patented Aug. 4, 1942

2,291,613

UNITED STATES PATENT OFFICE 2,291,613

PROJECTION PRINTER

Glen M. Dye, Minneapolis, Minn.

Application November 7, 1938, Serial No. 239,269

14 Claims. (Cl. 88—24)

This invention relates to a projection printer for making photographic prints or to a machine for making oversized prints. The machine is designed to make projection prints from negatives of different sizes, which prints will have a size range comprising a very large proportion of such projection prints or enlargements now commercially made.

It is an object of this invention to provide a motor-driven projection printer which is constructed and arranged for rapid, convenient and efficient operation.

It is a further object of the invention to provide a projection printer including a multiple negative holder of simple and efficient construction and one that can be quickly and conveniently operated.

It is also an object of the invention to provide a printing device having a novel and preferably automatic means for discharging a print preferably in position with its face upward.

It is still another object of the invention to provide a projection printer for commercially making oversized or enlarged prints by means of which various standard sized prints may be produced from different sized negatives and in which single sized prints may be produced from one negative with various magnifications.

It is also an object of the invention to provide a projection printer in which single sized prints may be made from one negative with various magnifications, and in which prints with white margins of varying widths may also be made.

It is still further an object of the invention to provide a projection printer having simple and efficient means for placing an identifying character on each print together with simple and efficient means for inking said means.

Another object of the invention is to provide a projection printer having the focusing elements connected for synchronous movement so that the projected image is always in sharp focus, a pointer associated with said elements, a series of masks each bearing an identifying character, a series of negative holders, each bearing an identifying character together with a movable index member having spaced thereon said first mentioned characters and having said second mentioned characters whereby said pointer can be moved to align with one of said second mentioned characters to properly position said elements for the mask and negative holder being used.

More specifically it is an object of the invention to have said index member in the form of a vertical column having said first mentioned characters arranged circumferentially thereon and said last mentioned characters spaced vertically thereon, said pointer being movable vertically along said column.

Still another object of the invention is the provision of a projection printer having efficient light shielding means including an automatically operated curtain moving to light obstructing position during the printing period.

It is still further an object of the invention to provide a projection printer having a novel construction of platen mounting and comprising a service cabinet having means arranged in a novel manner for receiving the print paper, the masks used and also work orders, said means being arranged to enable the operator rapidly and easily to operate the machine.

Another object of the invention is to provide a novel construction of condenser mounting and lamp casing construction for use in a projection printer, the same being easy of access and easily cleaned.

Another important object of the invention is the provision of a novel exposure guide device for more accurately controlling a suitable printing exposure.

Another object of the invention is the provision of a novel commercial projection printer complete with all necessary equipment within easy access of the operator.

These and other objects and advantages of the invention will be fully set forth in the following description made in connection with the accompanying drawings in which like reference characters refer to similar parts throughout the several views and in which:

Fig. 9 is a horizontal section taken just above the negative holding means;

Fig. 10 is a diagrammatic view illustrating the relation between the openings in the negative holder, the lens and the print;

Fig. 11 is a perspective view of one of the masks used;

Figs. 12 to 14 are respectively of different sizes of masks used;

Fig. 15 is a view partly in side elevation and partly in vertical section of the driving mechanism, a section being taken through the lower part of the clutch and the enclosing casing;

Fig. 16 is a horizontal section taken through the top of the casing enclosing the driving parts and showing the driving parts in plan;

Fig. 17 is a vertical section taken through the casing enclosing the driving parts showing the driving parts in side elevation, some parts being shown in section;

Fig. 18 is a vertical section through the casing enclosing the clutch showing the clutch and friction mechanism in side elevation;

Fig. 19 is a fragmentary view showing the tripping mechanism for the printing lamp switch;

Fig. 20 is a view mostly in front elevation showing the connection between the driving clutch and the print carriage, some parts being shown in vertical section;

Fig. 21 is a view in side elevation as seen from the right of Fig. 1 of the print discharging means;

Fig. 22 is a view in front elevation of the parts shown in Fig. 21, some parts being shown in vertical section;

Fig. 23 is a view in side elevation of the parts shown in Fig. 22;

Fig. 25 is a plan view of the mask carrier;

Fig. 25a is a fragmentary view showing a section taken on line 24—24 of Fig. 25 as indicated by the arrow;

Fig. 26 is a view in side elevation of the platen numbering and inking mechanism, some parts being shown in vertical section and some parts shown in different positions in dotted lines;

Fig. 27 is a vertical section taken on line 27—27 of Fig. 28 as indicated by the arrow;

Fig. 28 is a plan view of the platen mechanism;

Fig. 29 is a view partly in vertical section and partly in side elevation of a numbering device;

Fig. 30 is a vertical section taken substantially on line 30—30 of Fig. 5, some parts being omitted;

Fig. 31 is a vertical section taken on line 31—31 of Fig. 30;

Fig. 34 is a vertical section through the exposure guide device;

Fig. 35 is a vertical section through a portion of the exposure guide device; and Fig. 36 is a vertical section taken on line 36—36 of Fig. 34 as indicated by the arrows.

Figure 1:
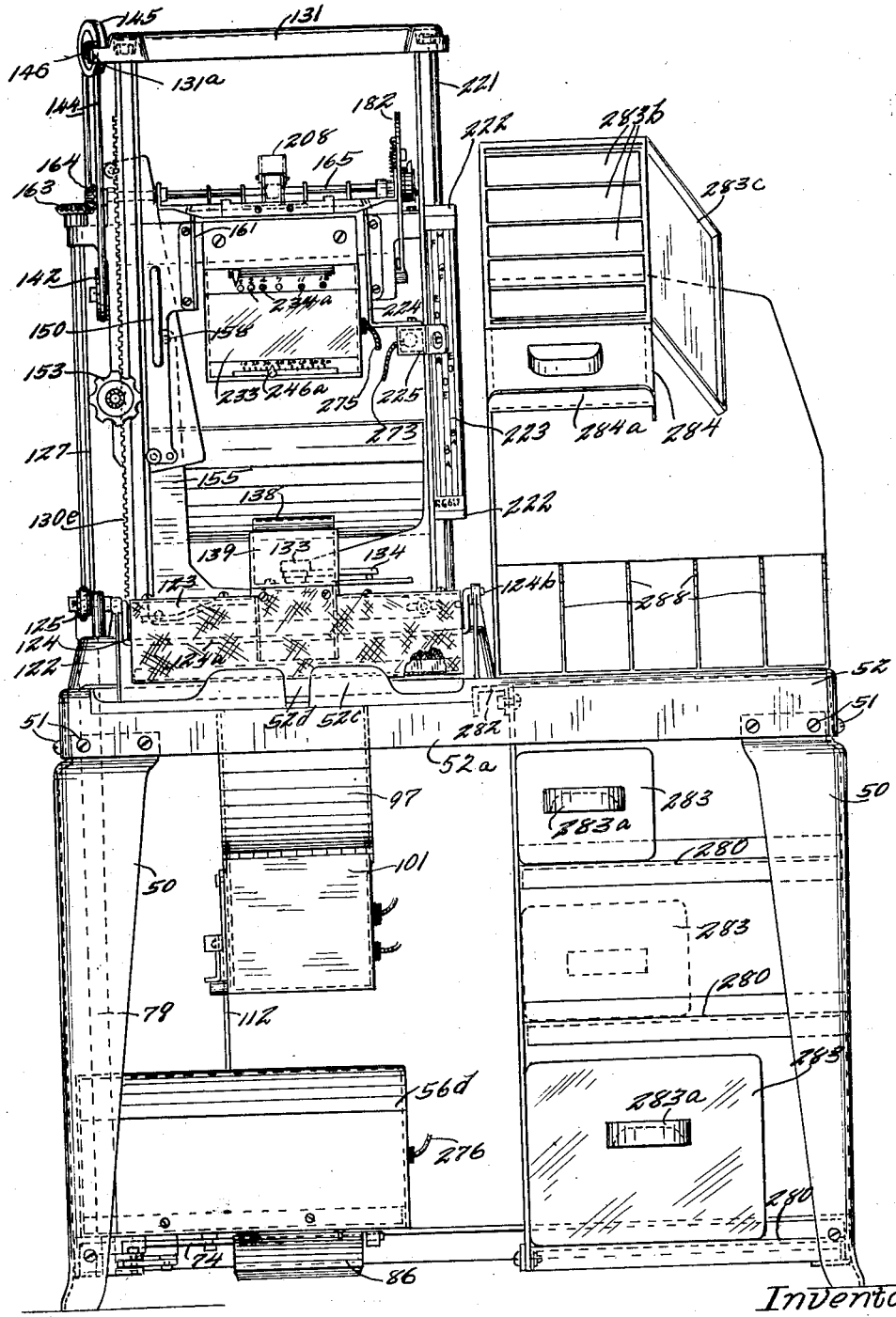
Fig. 1 is a view in front elevation of the machine.
Figure 2:
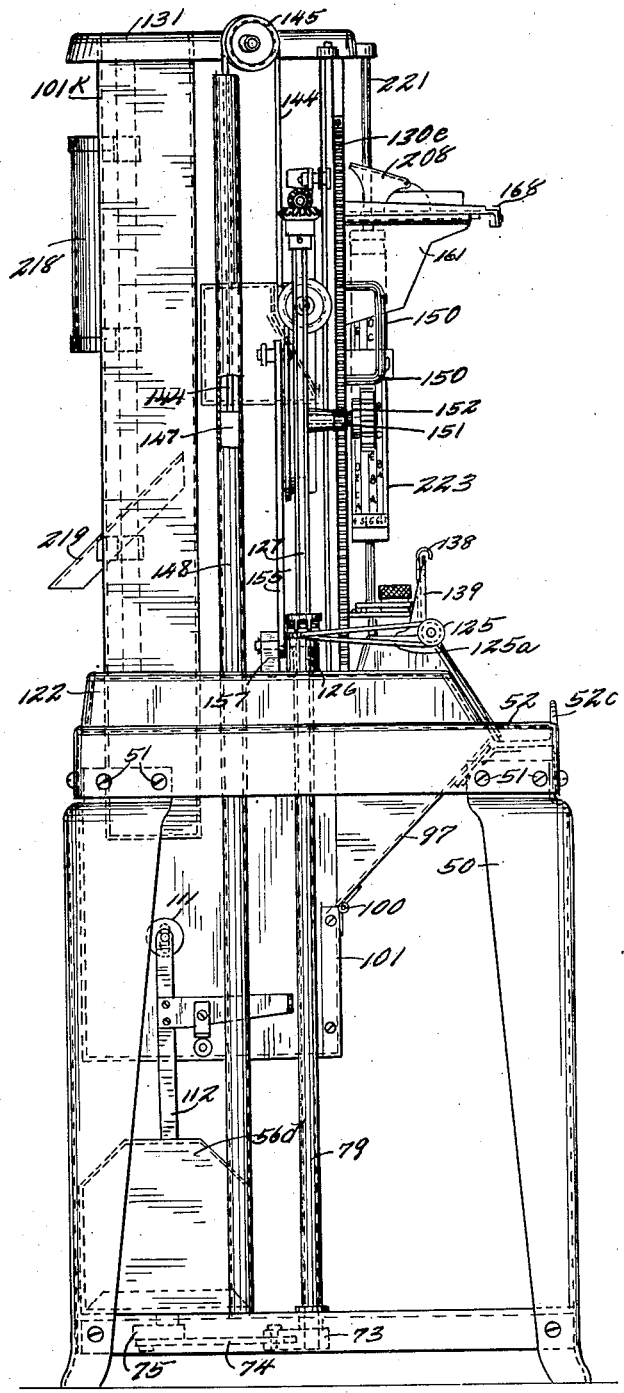
Fig. 2 is a view in side elevation as seen from the left of Fig. 1.

Referring to the drawings a machine is shown comprising a frame including legs 50 shown as four in number. These may be of any suitable construction and are illustrated as of angle shape in cross section tapering toward their lower ends, with the inside of their angles disposed inwardly and secured at their upper ends by screws 51 to a substantially horizontal plate or table 52 having a depending flange 52a extending thereabout with the inner side of which legs 50 engage. A bar 53 of angular cross section extends between legs 50 at one side adjacent their bottoms and another bar or plate 54 extends between the pair of legs at the opposite side adjacent the bottom thereof. A bar 55 shown as angular in cross section is also secured to and extends between the rear legs 50 adjacent their bottoms. A plate 56 having upturned flanges at its edges is secured to bars 53 and 55 and an electric motor 57 is supported by and secured to plate 56. A pulley 58 is secured to the armature shaft of motor 57 and has a belt 59 running thereover which also runs over a pulley 60 secured to a shaft 61 journaled in a bearing 62a carried in a plate 62. Plate 62 forms part of a clutch frame and is supported upon posts 63 shown as four in number and is secured thereto by headed screws 64. Posts 63 seat on plate 56 and are secured thereto by the screws 64. Shaft 61 has a worm gear 65 secured thereto which meshes with a worm wheel gear 66 secured to a shaft 67 journaled in a bearing 68 carried by plate 62. A clutch plate 69 is secured to the end of shaft 67 and when the machine is in operation is continuously driven from motor 57. Plate 69 cooperates with another clutch plate 70 adapted to be brought into engagement therewith at certain times and to be driven thereby. Plate 70 will have some suitable friction material 70a thereon and is secured to a shaft 71 journaled in a bearing 72 carried by plate 56 on arm 73. Arm 73 is pivotally connected to a link 74, the other end of which is secured to an arm 75 having a hub secured in any suitable manner as by pin 76 to a shaft 77. Shaft 77 is journaled in a bearing 78 secured in plate 56 and has an enlarged portion above said plate extending into and secured in the lower end of a tubular shaft 79 as by a pin 80. Shaft 79 extends vertically adjacent one side of the machine and is secured to a pulley block 126 to be later described which has a reduced portion 126a journaled in an opening in a casing top 122a to be later described. The clutch comprising plates 69 and 70 is a half revolution clutch and includes a third plate 81 having downturned ears at opposite sides and to which are secured studs 82 having journaled thereon rollers 83. Plate 81 has apertures at either side through which extend studs 70b secured to and depending from plate 70, said studs having pins 84 extending therethrough below plate 81. Compression coiled springs 85 surround studs 70b engaging plate 70 at their upper ends and plate 81 at their lower ends. The plate 56 has spaced openings 56a thereon spaced the same distance as the rollers 83 and into which rollers 83 are adapted to drop to determine the half revolution period of the clutch. Said clutch is adapted to be actuated by a toe trigger or pedal 86 oscillatable about the axis of a rod or shaft 87 journaled in small blocks 88 secured to the underside of plate 56. A bar 89 is secured to shaft 87 by which the trigger plate 86 is carried and an arm 90 is secured to and extends rearwardly from bar 89 and carries clutch actuating parts adapted to raise plate 81. The trigger plate also has upstanding therefrom a stud 91. A tensile control coiled spring 92 is secured at one end to a projection on plate 60 and is secured at its other end to the upper end of stud 91 and said spring acts to hold trigger plate 86 in its raised or inoperative position. When trigger plate 96 is pressed downwardly by the toe of the operator to its lower position the clutch makes one-half a revolution and arm 73 also makes a half revolution or rotates through 180 degrees. A boxlike cover 56d fits over the flange on plate 56 and forms an enclosure for the motor and clutch parts. The specific construction of the clutch need not be further described as it per se forms no part of the present invention. A casing 50a secured to plate 56 encloses arm 75.

A lamp box is provided, the top of which is formed by a plate or casting 52b which is secured in and in effect forms part of table top 52. Said plate 52b has a flange 52c at its forward end having therein a slot or opening 52d which is continued as a slot through the bottom of plate 52b for some distance. Said plate 52b has a raised portion 52e therein and a trough 52f is formed at the front portion of the plate 52b between flange 52c and portion 52e. Portion 52e is apertured and has a depending cylindrical flange 52g extending downwardly therefrom. An annular flange 52h is formed in portion 52e and forms the support for a lens 93. Said lens may be positioned on a resilient annular strip 94 shown as circular in cross section. Said lens 93 is held in position by a plate 95 which may be made of any suitable material and in practice has been made of masonite. Plate 95 is secured to portion 52e by countersunk screws 95a. A small bracket 96 is secured to the underside of plate 52b at its forward portion by small screws 96a and has a lip extending downwardly and inwardly substantially at a 45 degree angle. A front plate 97 is provided for the lamp box, the same having a latch 97a pivoted thereto by a pivot member 97b, said member 98 being adapted to be moved over the inner side of bracket 96 to hold plate 97 in closed position. Plate 98 has small brackets 97c secured thereto, the same being offset to form lips directed toward each other and to extend over a mirror 98 which is thus secured to the inner side of plate 97. Plate 97 is hinged by a hinge 100 to the vertical stationary front side plate 101a of the lamp box casing 101. Side plate 101a has secured thereto adjacent its bottom a resilient cushion block 100a against which plate 97 will engage should it be dropped. Casing 101 has a bottom plate 101b having an aperture 101c therethrough, one function of which is to admit cool air into the lamp box. The lamp box also comprises side plates 101d which engage the outer side of flanges 52i formed on plate 52b and to which they are secured. Brackets 102 illustrated as formed from angle members are secured to side plates 101d and extend across the lamp box adjacent the bottom thereof. Headed screws 103 extend through the lower part of bracket 102, being held therein by nuts 104, said bolts also extending through a plate 105 and being equipped with wings or thumb nuts 103a beneath plate 105, said nuts thus holding said plate in position. Plate 105 is centrally apertured and forms a seat for a ball member 106a formed on a rod 106 which extends through the bottom of the lamp box through opening 106c and carries at its upper end the lamp socket 106c in which the printing lamp 107 is secured. Rod 106 has a handle 106b at its lower end. A stationary contact member 108a forming one part of the printing lamp switch 108 is carried on a small angle bracket 109 secured to one side plate 101b. The movable contact 108b of switch 108 is carried on a pin 110 slidable vertically in a slot in side plate 101b, plates 111 of insulating material being disposed at the inner and outer sides of side plate 101b and moving with and forming in effect guide members for pin 110. Pin 110 extends through a vertically movable bar 112, said pin having a head formed thereon at the outer side of said bar and having a small cotter pin 113 extending therethrough at the inner side of inner plate 111. Bar 112 extends downwardly through a slot 62a in plate 62 and has formed therein a notch 112a adapted to engage with plate 62 at one side of slot 62a as shown in Fig. 19. Bar 112 has adjustably secured thereon a block 112b held in place by a screw 112c and said block is adapted to be engaged by a projection 83a on one of the rollers 83 in the revolution of plate 81. This disengages notch 112a from plate 63 and bar 112 is moved downwardly by a tensile coiled spring 114 secured to bar 112 at one end and at its other end to plate 63. A pilot lamp 107a is also provided in the bottom of lamp box casing 101. A second and condensing lens 93a is provided disposed at right angles to lens 93 and carried in an angle bracket 101e and secured therein by headed and nutted bolts 101d'. Spring washers 101f are disposed under the nuts on bolts 101d' and clamping members 93b which may be of resilient material are disposed under the heads of the nuts on bolts 101d and engage lens 93a. It will be seen from Fig. 30 that lenses 93 and 93a are flat on one side and have convex surfaces at their other side, said convex surfaces being directed toward mirror 98. A flat casing 101h is disposed below plate 52b above lamp 107, the same containing insulating material 101i. Said parts are provided to prevent the heat from lamp 107 unduly heating plate 52b thereabove. An opening 101j leads from the upper part of the lamp box and communicates with a vertical flue 101k which extends upwardly to the top of the machine and is secured in a yoke 131 to be later described. While said flue may be of any form, in the embodiment of the invention illustrated it is shown as rectangular in cross section.

Figure 6:
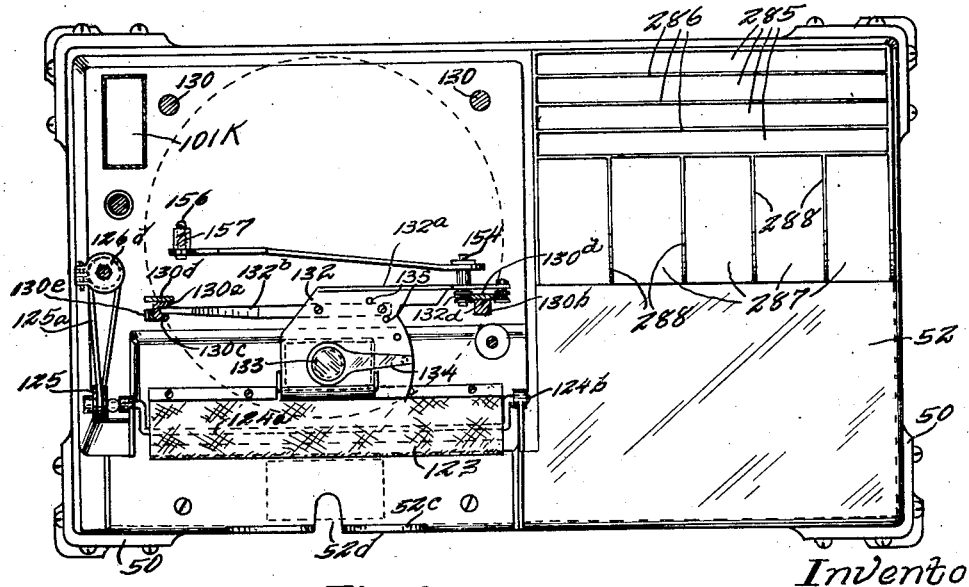
Fig. 6 is a horizontal section taken just above the lens carriage.

The member 95a has an opening therein through which the light for printing passes and the top surface of member 95 forms the supporting surface for the negatives such as films which are to be printed. A negative holding means is provided comprising a rotatable plate or turret 115. Plate 115 is rotatably mounted on a pin 116 secured in member 52b and is arranged to be raised by a sleeve 117 disposed therebeneath and slidable on pin 116. A rest for plate 115 is provided comprising a headed screw 115d adjustably threaded into member 52b and adapted to be held in adjusted position by a lock nut 115b. Sleeve 117 is adapted to be lifted by a lever 118 having end portions disposed in opposite sides thereof, said lever having parallel spaced portions joined at their ends remote from sleeve 117. Lever 118 is arranged to tilt about a fulcrum member 119 carried on member 52b. An operating means for plate 115 is provided and comprises a knee-operated lever 120 having a horizontal portion 120a journaled in bearings 121 secured to the underside of table 52, said portion being bent at its end substantially at a right angle, and disposed to overlie the closed or outer end of lever 118. Lever 120 also has an outer downwardly extending portion 120b formed with spaced parallel sides, which portion is contacted by the knee of the operator. While lever 120 may be of any suitable form, in the embodiment of the invention illustrated it is shown as made from a round rod. It will be seen that by pressing laterally on portion 120b plate 115 will be lifted and it can then be easily rotated about pin 116. Plate 115 has quite a number of circumferentially spaced openings 115a therethrough adjacent its circumference, which openings are of different sizes and shapes. Openings 115a are thus adapted for use with negatives of different sizes and are adapted to determine different areas to be printed. Flat spring members 115c are secured at either side of one of the openings 115a and press on plate 115 at the sides of said opening, said springs being adapted to hold certain small films or to engage a special holding means for a very small film such as a strip film from a motion picture camera. Plate 115 is adapted to be held or locked in position with one of the openings 115a over the light opening 95a and for this purpose said plate is provided with a plurality of holes 115d, there being one for each opening 115a. When the respective opening 115a is in proper position relative to the light opening the corresponding hole 115d receives a pin 115e which upstands from member 52b. When the plate 115 is lifted for rotation it is lifted clear of pin 115e. A casing 122 having a substantially horizontal top 122a spaced a short distance above table 52 extends over holder 115, the same having outwardly and downwardly sloping sides. Said casing 122 is open at its front for the insertion and removal of the negatives and also has its top 122c offset upwardly at said front. The open front portion of casing 122 is closed during the printing operation by a flexible opaque curtain 123. Curtain 123 is weighted at its lower edge in any suitable manner as by having a metal rod secured thereto at said edge. In the embodiment of the invention illustrated curtain 123 is shown as formed of a folded piece of material and a bar 123a is disposed in the bight or lower folded portion of the curtain and forms the weight for the edge thereof. Said curtain and weighted edge overlap at their ends the downwardly and outwardly sloping front portions 122b of casing 122 which are disposed at each side of the opening in its front as shown in Fig. 9. Curtain 123 is moved to open and closed position by a crank rod 124 having the portion 124a extending across the underside of said curtain, said rod having portions 124b journaled in bearings in casing 122 at each side of said curtain. Portions 124a and 124b are parallel and spaced about half the vertical width of curtain 123. One portion 124b at the left of Fig. 6 is extended and has secured thereto a pulley 125. A belt 125a runs over pulley 125 and turns through a right angle to run in a groove 126b in pulley block 126. Block 126 is secured to the tubular shaft 79 by a screw 126c. A cap 126d is clamped to block 126 having ears depending at one side thereof to receive a clamping bolt 126e. A shaft 127 of polygonal shape in cross section illustrated as of hexagonal shape fits in a corresponding aperture in cap 126d and is driven thereby from tubular shape 79 through block 126. Cap 126d may be adjusted to vary the position of shaft 127 relatively to shaft 79 for a purpose to be later described. The belt 125a is secured to pulley block 126. Crank rod 124 is oscillated through substantially 180 degrees at the beginning and end of each printing operation and portion 124a folds and lifts curtain 123 to open position and then lowers it to closed position. The pulley block 126 oscillates at the beginning and end of each printing operation and moves through slightly more of a revolution than is necessary to operate crank rod 124 and raise and lower curtain 123. Belt 125a slips on pulley 125. The curtain and crank 124 may be operated manually at any time if it is desired to look into the opening in casing 122. This can be done without throwing the operation of crank 124 and curtain 123 out of step or synchronism with the machine. The belt 125a will merely slip on pulley 125 and said pulley and crank rod will again be operated at the proper time in the operation of the machine by belt 125a from block 126.

Two rear rods 130 and forward rods 130a and 130b are secured at their lower ends in top 122a and extend vertically to a three sided yoke 131 having forwardly extending parallel sides spaced at their front ends. While yoke 131 could be variously made, in the embodiment of the invention illustrated it is shown as in the form of a channel with its open side directed downwardly. The forward rod 130a is rectangular in cross section and has a groove 130c rectangular in cross section at its inner side. Rod 130b is illustrated as rectangular or substantially square in cross section. Rods or posts 130, 130a and 130b form guides on which are slidable two assemblies, one of which carries the projecting lens and the other and upper of which carries the paper supporting and handling mechanism. The first of said assemblies includes a plate or lens carriage 132 having a rather long portion 132a carrying spaced rollers 132d engaging opposite sides of a vertical flat bar 130dd secured to bar 130b. Carriage 132 has an arm 132b extending across to and having its end disposed and slidable in the groove 130c, said arm 132b thus constituting a steadying and guiding means. Carriage 132 carries the lens unit 133 which comprises the usual iris or diaphragm for exposing more or less of said lens or increasing or diminishing an opening close to said lens. This iris is arranged to be operated by an oscillating arm 134 movable to and adapted to be held in different positions indicated as 135 on plate 132. Plate 132 has secured thereto and depending therefrom spaced plates 136 extending forwardly and rearwardly, said plates being connected by a similar rear plate 137. Plates 136 and 137 move close to the sides of an opening in top plate 122a and prevent the passage of light outwardly from casing 122 when lens unit 133 moves upwardly. Also movable with the lens carriage at the front and above plates 136 and 137 is a plate 138 having a forwardly curved upper end which extends over a plate 139 fixed to the top plate 122a. Plate 139 has its side edges bent around and forming guides for plate 138. Plates 138 and 139 prevent the passage of light upwardly.

The other of said two assemblies constitutes a paper carriage and comprises a member 140 having a sleeve portion 140a slidable on forward rod 130a and a small roller 140c engaging a flat bar 130d secured to bar 130a. Casing 140 also has a portion 140b slidable on rod 130b. Portion 140b has a smaller roller 141 journaled therein and arranged to roll on the outer side of rod 130dd. Member 140 at one side has secured thereto a pulley 142 rotatable on a headed stud 143 secured in member 140. A cord or cable 144 is secured at one end to a lug 131a projecting from yoke 131 and extends downwardly around pulley 142 and then upwardly and over a pulley 145 rotatable on a headed stud 146 secured in yoke 131. From pulley 145 cable 144 extends downwardly and is connected to a rather long cylindrical counterweight 147 (see Fig. 7) which is movable in a tube 148 disposed at one side of the machine and secured in table 152 and in plate 56. Member 140 has projecting forwardly therefrom a bail handle 150. Rod 130a has a rack 130e formed on or secured to its outer side with which meshes a small pinion 151 carried on a shaft 152 journaled in member 140, said shaft having secured thereto at the front of member 140 a small hand wheel 153. It will be apparent that member 140 and parts supported thereon may be raised and lowered by handle 150 and that accurate adjustment may be had by turning hand wheel 153. Movement of the paper carriage is quite free and easy due to counterweight 147.

The lens carriage and paper carriage are interconnected and arranged for determined relation in movement so that the image projected by the lens will always be sharply focused on the paper by lens unit 133. To this end member 132 has a pin 154 projecting at its rear and disposed in an arcuate slot 155a formed adjacent the end of one arm 155b of a bell crank lever 155 pivoted on a pivot 156 supported in a small bracket 157 secured to top plate 122a. Lever 155 has its other arm 155c extending upwardly and said arm 155c has a pin 158 secured therein which pin is disposed in and arranged to move in a cam slot 159a formed in a cam plate 159 secured to the paper carriage 140 by screws or bolts 160 at each end thereof. Said cam plate is arranged for some adjustment and to this end is provided with elongated slots 159b through which pass the headed tightening screws 160.

The paper carriage 140 has secured therein by plate brackets 161 having dove-tailed grooves therein a plate glass portion 162, which has bevelled sides fitting in said grooves. The shaft 127 already mentioned extends upwardly to and has a reduced portion journaled in a bearing 140g. Above said bearing 140g shaft 127 has secured thereto a beveled gear 163 with which meshes another beveled gear 164. Gear 164 has half the number of teeth of gear 163 so that said gears have a ratio of two to one. Gear 164 is secured to a shaft 165 extending horizontally and journaled in bearing portions 140d and 140e respectively of carriage 140. A mask carrier 166 is provided having a central portion formed as a comparatively thin flat plate at the sides of which are plate-like portions 166a disposed in substantially vertical plane and having a small height at their front ends but increasing in height toward their rear ends. One of said portions 166a extends to and is swingingly connected to the shaft 165 through a collar 167 which is secured to said portion 166a and is journaled on shaft 165. Carrier 166 has a central opening 166b therein of greater area than any printed area to be made on the machine. Upstanding lugs 166c are formed in carrier 166 at the rear of opening 166b and disposed equal distances from the forwardly extending center line of said opening. Lugs 166c are formed by small angular plates secured to the bottom of carrier 166 and having vertical portions projecting through slots 166e formed in said carrier. Said upstanding portions have laterally extending slots 166f formed therein at their adjacent sides just above the top surface of carrier 166. Spring clips 168 are secured to the carrier 166 at its front edge and are also disposed equal distances at each side of said center line. The front edge portion of carrier 166 is slightly downturned as seen in Fig. 21 and said clips 168 are secured to said downturned portion by screws 169. A plurality of masks 170 are provided, typical ones of which are illustrated in Figs. 11 to 14. These masks will each bear an identifying character of a series such as a number or letter. In the embodiment of the invention illustrated numbers are used. Said masks which are shown as made from quite thin sheet material such as metal, have right angle notches 170a cut in their rear corners and have similar notches 170b cut in their front corners. When the mask is placed in position on carrier 166 the lateral edges of notches 170a fit between lugs 166c and the lateral edges of notches 170b fit between spring clips 168, the mask adjacent notches 170b slipping under said clips. The part of the masks at the rear are received in the slots 166f of the lugs 166c. The distance between the lateral edges of the slots 170a at the rear of the masks is the same for each mask. The distance between the adjacent lateral edges of the notches 170b at the front of each mask is the same for each mask but this distance is greater than the distance between the edges of the rear notches. This difference is provided so that the operator cannot get the masks in the wrong position with rear end in front. Each mask has an opening therein which determines the area on the print paper exposed for printing. Each mask 170 also has upstanding plate-like parallel ribs 170c disposed equal distances at each side of the opening therein, which ribs have their front end portions extending inwardly some distance at right angles. Ribs 170c form guides enabling a rapid positioning of the print paper.

A platen structure is provided comprising a platen plate 171 adapted to engage the print paper. Plate 171 has a pair of upstanding lugs 171a at each side thereof having rearwardly projecting portions 171b, said lugs having forward and rearward surfaces at their tops which slope downwardly from a meeting line. Lugs 171a project through slots 172a in a platen carrier 172 and said top surfaces of lugs 171 are engaged by plate springs 173 secured at their midpoints to carrier 172 by screws 174. Springs 173 have their ends 173a bent to correspond to the slope of the top surfaces of lugs 171 and said ends engage the forward sloping surfaces of each pair of lugs 171. It will be noted that slots 172a are of sufficient length for the entire length of lugs 171 to pass therethrough. As shown in Fig. 27, lugs 171 have their rear edges in contact with the rear edges of slots 172a. It will be seen that the springs 173 urge lugs 171a rearwardly to the position shown in Fig. 27. By moving plate 171 forwardly the lugs 171a may be passed through the slots in carrier 172 and said plate removed therefrom. With the described construction it will be seen that platen plate 171 is yieldingly mounted on carrier 172 and will be yieldingly pressed against the print paper. Carrier 172 has upstanding plate-like ribs 172b along its side edges which increase in height toward their rear ends and extend to shaft 165. Said ribs 172b are apertured to receive shaft 165 and are pivoted thereon. A platen actuating arm 175 is secured to shaft 165 centrally laterally of carrier 172 and extends over said carrier between upstanding lugs 172c. Said arm 175 is yieldingly connected to carrier 172 by a headed and nutted bolt 176 surrounded by a compression coiled spring 177 and which engages the top of a slot 175a and carrier 172, the tension of which is adjustable. Slots 171b in platen 171 accommodate the mask ribs 170c.

Figure 3:
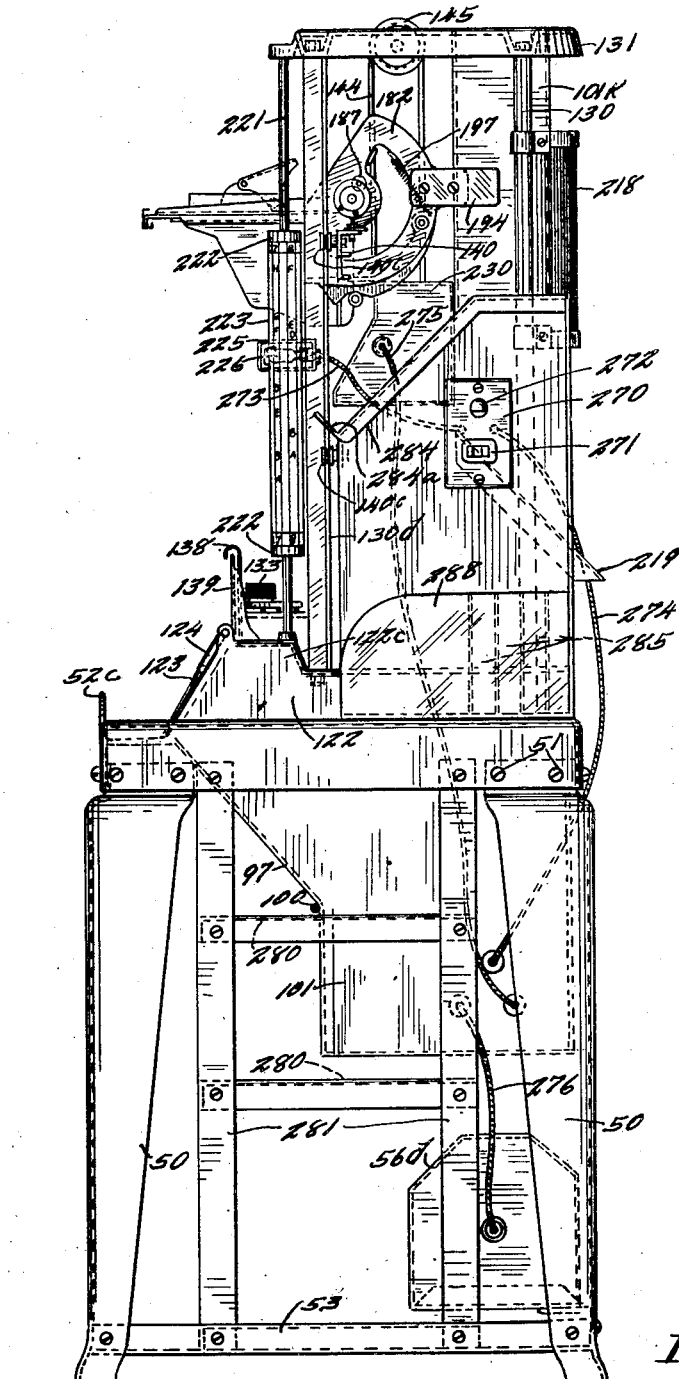
Fig. 3 is a view in side elevation as seen from the right of Fig. 1.
Figure 4:
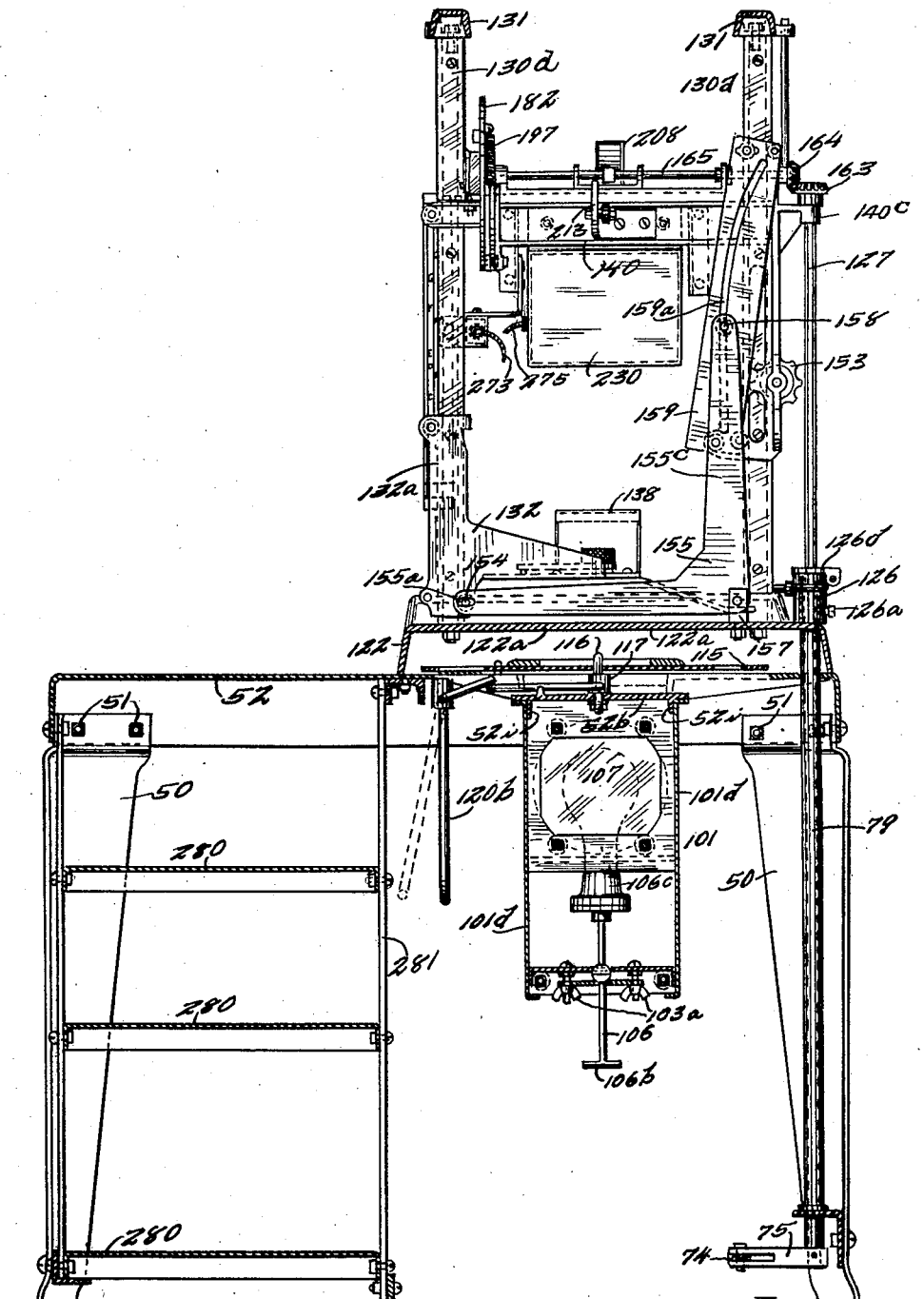
Fig. 4 is a view partly in rear elevation and partly in vertical section taken through a negative holder and lamp box as well as through the drawer-supporting shelves on the frame.
Figure 5:
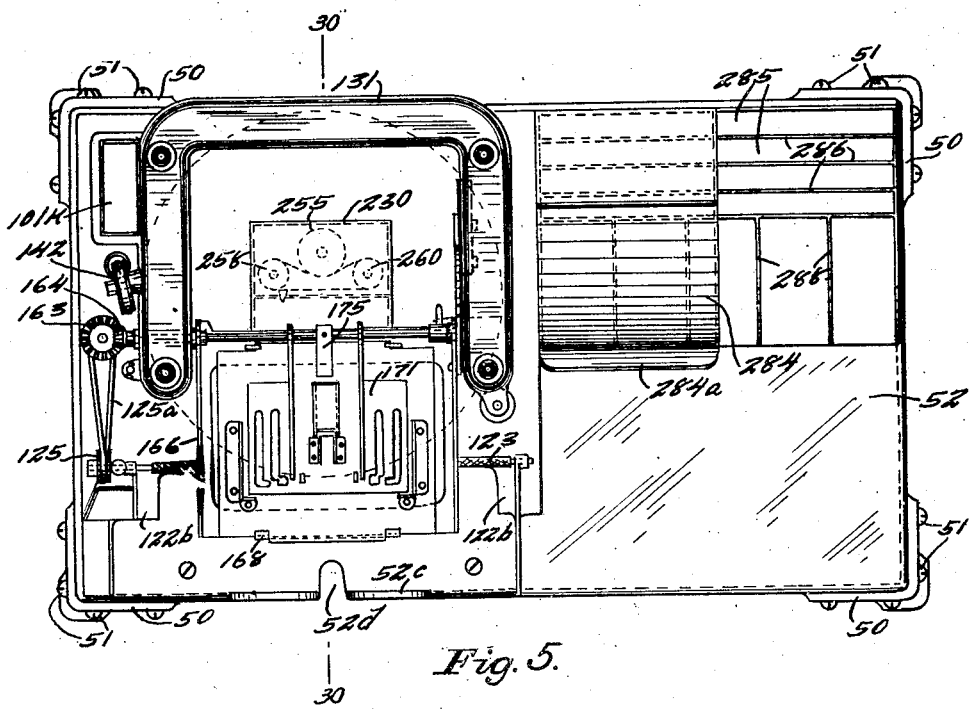
Fig. 5 is a plan view of the machine.
Figures 7, 8:
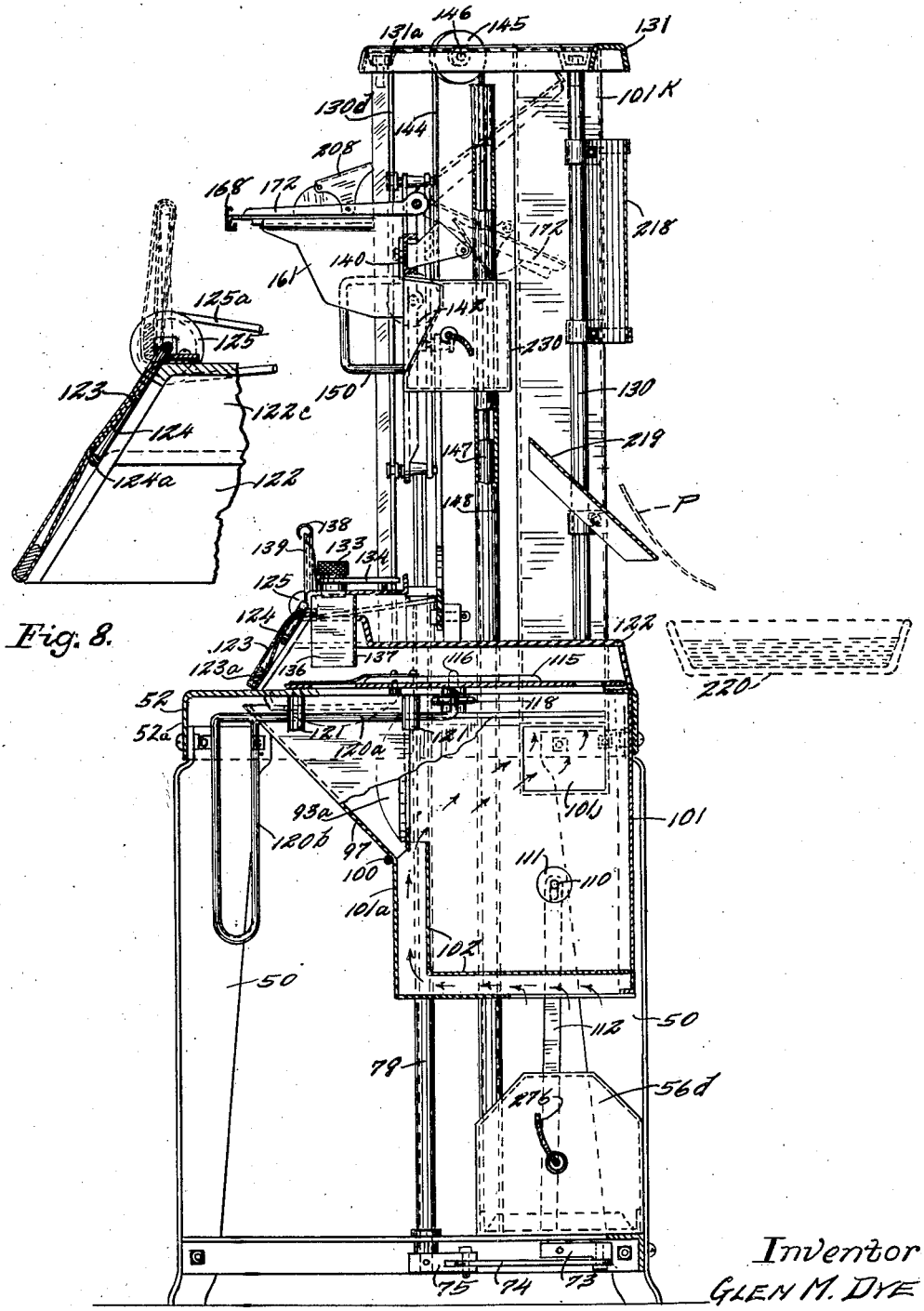
Fig. 7 is a view partly in side elevation as seen from the right of Fig. 1 and partly in vertical section taken through the lamp box and light casing.
Fig. 8 is a view in vertical section through the front of the printing casing and closing curtain shown on an enlarged scale.
Figure 24:
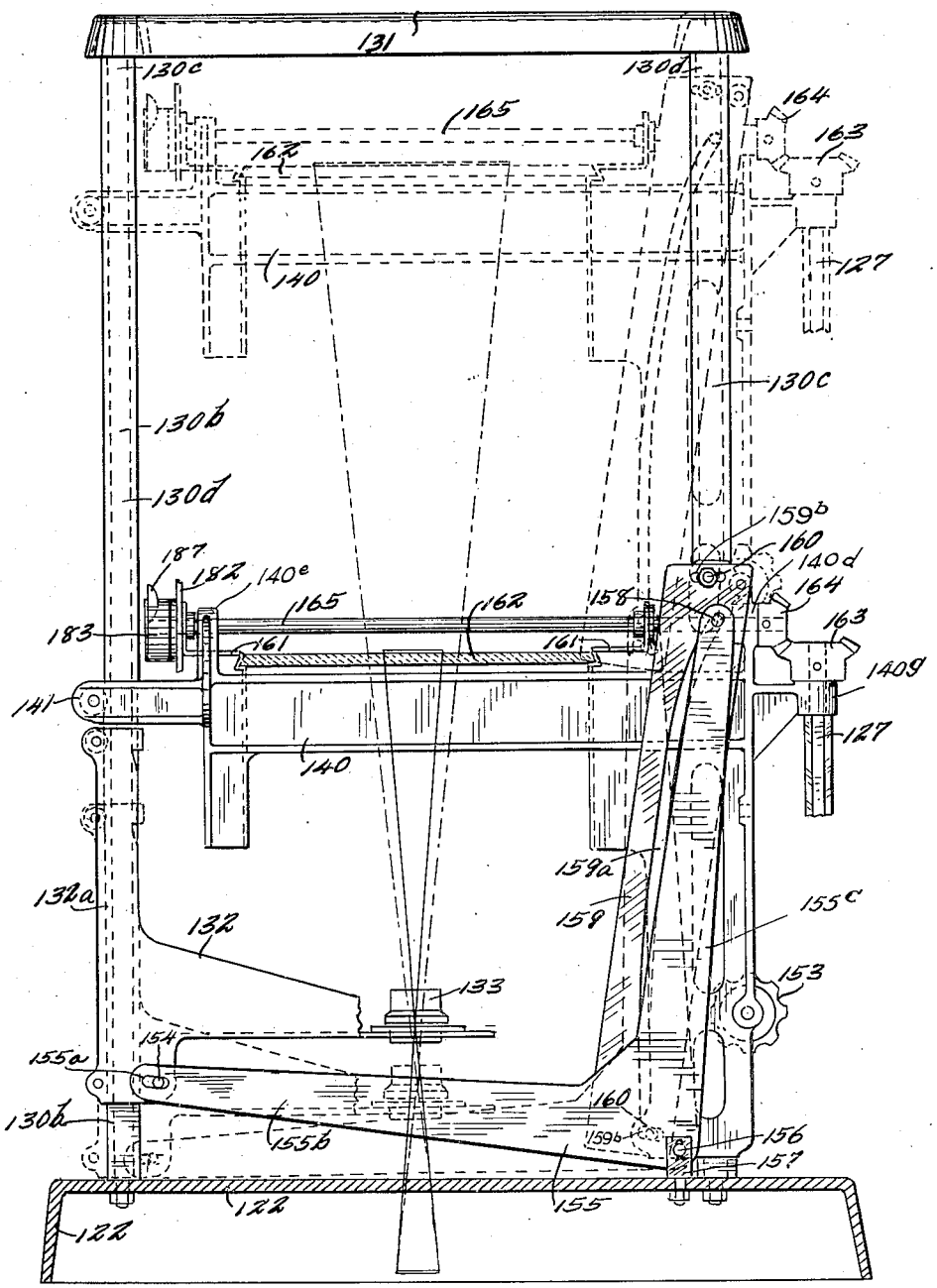
Fig. 24 is a view in rear elevation showing the connection between the lens carriage and the paper carriage, the parts being indicated in different positions in dotted lines.

Mask carrier 166 and platen carrier 172 are adapted to swing upwardly and rearwardly together at the end of the printing period to discharge the print and for this purpose the portion 166a at the right extends to and is apertured to receive shaft 165. A cylindrical collar 180 (see Fig. 22) is bored to receive shaft 165 and has a hub extending through portion 166a of carrier 166. Collar 180 is secured to portion 166a by screws 181 which pass through a plate 182 between portion 166a and collar 180. A cylindrical clutch body 183 is secured to shaft 165 by a pin 185 and has its inner side close to the outer side of collar 180. A pin 186 extends through a bore in body 183 parallel to shaft 165 and is adapted to enter and be withdrawn from a cylindrical hole in collar 180. Pin 186 has connected to its outer end a segment of a sphere or a cone 187 having its conical surface directed inwardly. Said segment or cone has its outer flat side engaged by one side of a flat annular spring 188 secured by screws 189 to the outer side of body 183. Cone or segment 187 is adapted to engage the pointed or conical end of a pin 190 threaded into a plate 191 and held in adjusted position therein by a lock nut 192. Plate 191 is connected to paper carriage 140 for longitudinal adjustment thereon by screws 193. The plate 182 as shown in Figs. 3 and 21 is in the form generally of a segment of a circle and the same has secured thereto a counterweight 194. Said plate has therein a semi-annular opening 182a arranged to embrace a portion of print carriage 140 in the movement of plate 182. Plate 182 has pivoted thereto by a screw 195 a curved arm 196 to one end of which adjacent pivot 195 is attached a tensile coil spring 197 functioning to hold a lip 196a at the other end of said arm against a lug 182b on plate 182. Spring 197 is connected at its upper end to a lug 182c on plate 182. Arm 196 has a curved recess 196b therein adjacent its free end. Arm 196 is adapted to engage or ride upon a roller 198 journaled upon a stud 199 secured in paper carriage 140. With the described structure it will be seen that upon rotation of shaft 165 with the mask carrier 166 and platen 171 in print holding and printing position block 183 will be rotated and by means of pin 186 collar 180 will be rotated thus rotating and lifting portions 166a and the mask carrier 166 and the mask held thereon. At the same time platen actuating arm 175 will lift or rotate platen carrier 172 and with it the attached platen 171. The mask and platen will be lifted and oscillated together with the print therebetween until cone or segment 187 engages pin 190. This moves cone 187 and pin 186 outwardly thus disconnecting block 183 and collar 180. The mask carrier 166 is thus released from shaft 165. At this time the mask and carrier 166 has been moved some distance past the vertical as indicated in Fig. 7. When released, the mask carrier and mask thereon swing back to print receiving position. This swinging of the mask carrier back to print receiving position is caused by the weight 194 which has been moved around and past a position below the axis of shaft 165. To prevent too sudden a return and any pounding of the mask carrier, arm 196 rides against roller 198 and exerts tension on spring 197. This retards motion of plate 182 and the mask carrier comes gently to rest as roller 198 enters recess 196b. It will be noted that arm 73 is oscillated through 180 degrees at each printing operation. This oscillates arm 75 through link 74 somewhat less than 180 degrees as seen in Fig. 16. In practice arm 75 swings through about 112 degrees. Shaft 127 is thus rotated less than 180 degrees and shaft 165 will be oscillated twice as far as shaft 127 due to gears 163 and 164 or approximately 224 degrees. After the mask carrier therefor is released the platen continues to oscillate with shaft 165 and finally slopes rearwardly and downwardly as seen in Fig. 7 so that the print is discharged downwardly and rearwardly in face upward position. The platen is of course, returned to print engaging position by movement of shaft 165 upon the next half revolution movement of arm 75. As stated, an adjustment can be had for the position of shaft 165 relatively to shaft 170 through the cap member 126d. This adjustment can be arranged so that the platen member comes into proper position against the paper and at the proper time. The platen plate is yieldingly pressed against the paper and this yielding pressure will be caused by springs 173. The member 187 must occupy its upper position at the time the platen is in contact with the paper. This adjustment is necessary so that the mask carrier and platen will be lifted together and there will be no lost motion in lifting the platen.

A numbering device is provided for placing an identifying number or character on each print made and for this purpose a numbering stamp is provided such as shown in Fig. 29. This comprises a rotatable numbering member 200 which may consist of several disks having numbers or letters thereon. A ratchet wheel 201 is connected to a shaft 202 on which the numbering member 200 is journaled. An actuating pawl 203 is shown connected to a lever 204. Lever 204 is held in position by a sear spring 205. The described parts are mounted in a frame 206. The numbering device can be changed by the operator pressing downwardly on lever 204. The numbering device shown in Fig. 29 per se forms no part of the present invention and is now in commerce. Said numbering device is connected to the platen carrier 172 between brackets 207 which are secured to said carrier. The numbering device 200 is such that it includes type which require inking. A bracket 208 is provided which is pivotally connected by a pivot pin 209 to the upper part of bracket 207. Said bracket 208 is of channel form having side portions 208a having curved converging sides as shown in Fig. 26 which are connected at their wide portions by a flat portion 208b. Said arms 208a have disposed therebetween an inkling roller 210 mounted on a headed stud 211 extending through and between arms 208a and held from movement by a cotter pin 212. A coiled torsion spring 209a is disposed about pivot pin 209 and secured to bracket 207, the same acting to hold bracket 208 in its normal position shown in Fig. 26. A bracket 213 is secured to the rear portion of paper carriage 140, the same projecting rearwardly therefrom and having secured therein a headed and nutted stud 214. A cam roller 215 is journaled on said stud between the head thereof and bracket 213.

When the platen is swung down against the paper the printing member 200 projects through an opening therein and impresses the identifying number or character on the paper. This pressure must be nicely regulated for if it is too great the emulsion on the paper will be effected and a blemish will be made on the print. The pressure on the paper by the printing member will be a differential between the pressure of spring 173 and of coiled spring 177. When the platen is swung upwardly and rearwardly with the mask carrier and when it continues its movement after the mask carrier is released the portion 208b of the bracket 208 will engage roller 215 as shown in Fig. 26. This will swing bracket 208 about its pivot 209 and the inking roller 210 will be moved over the numbering member 200 and in engagement therewith so that said numbering device will be properly inked. When platen carrier 172 swings back into position for the platen to engage the paper the bracket 208a will be moved to the position shown in full lines in Fig. 26 by spring 209a. A channel 218 extends between the rear rods or posts 130, the same having bands at its top and bottom extending about and clamped to said posts. A paper guide member 219 is also secured to posts 130 below the channel 218 for guiding the print P into a receptacle 220 indicated in dotted lines in Fig. 7 and which will be placed on some suitable support. A rod 221 secured at its upper end in yoke 131 and at its lower end in casing 132 has revolubly mounted thereon between collars 222 and index member 223. While this index member might be differently formed in the embodiment of the invention illustrated it is shown as in the form of a cylinder. The openings in the negative holding plate or turret 115 are each marked with an identifying character of a series and in the embodiment of the invention illustrated, they are shown as each designated by a letter of the alphabet. The index member 223 has the characters designating the openings 115a in vertical rows thereon, said characters being appropriately spaced. Said index member or column 223 also has arranged circumferentially thereon at top and bottom, the identifying characters of the masks provided for the machine. Thus each vertical column of letters on the index member has at its top and bottom a number corresponding to a certain mask. In Fig. 10 the column is positioned with its operating column of letters having the numerals 6½ at the top and bottom. A bracket 224 depends from one of the brackets 161 which holds the plate glass member 162 and has secured thereto a small casing 225 having a pointer 225a at one side adapted to move along and cooperate with the index member 223. In practice, the pointer will be horizontally aligned with one of the letters in the column at the front of said index member. Casing 225 also carries a lamp socket for receiving a small ruby lamp 226 which will furnish illumination for the operator to read the index member.

An exposure guide or meter is provided (see Figs. 1 and 32 to 36). A casing 230 of general rectangular form in vertical cross section is provided, the same being secured to the central part of paper carriage 140. A plate bracket 231 extends across casing 230 adjacent the bottom and forward portion thereof, being secured by screws 232 and forms a support for a mirror 233. Said bracket also supports a small casing 234 in the rear of said mirror which contains a lamp 235 shown as of elongated cylindrical form, the same being carried in a socket 236 secured to one end of casing 230. The front of casing 234 at its upper portion is provided with a plurality of holes or openings 234a and these will have extending thereover a diaphragm or sheet of material 237 of such nature so that light will show through holes 234a in different degrees of density. As shown in Fig. 31, the opening at the right is quite dark and the openings are progressively lighter toward the left. These openings may be designated by certain characters as shown by the numerals in Fig. 31. A bar 238 extends across the top of casing 230 being secured by screws 239, which bar has slidable thereon a pointer member 240. Below casing 234 is a cylinder 241 having a resistance conductor 242 wound thereon. Said cylinder 241 is held in apertures in spaced brackets 243 secured to casing 234 by screws 244. Brackets 243 also carry at their lower ends a bar or rod 245 on which is slidable a contact member 246 adapted to cooperate with the resistance member 242. Member 246 also carries a pointer 246a which cooperates with a scale 247 visible at the front of casing 230. A clock motor 248 of the conventional back geared type is mounted in casing 230, the same driving a clutch disk 249a of the clutch 249. An electromagnet 250 is provided, said magnet and motor being carried by a bar 251a extending across and secured in casing 230. The electromagnet 250 operates a clutch fork lever 251 which is arranged to engage and move a clutch disk 249b of the clutch 249 to bring the same into engagement with disk 249a. Disk 249a is shown as having its flat surface covered with some suitable friction material 249c. A small compression spring 251b is disposed between the disks 249a and 249b and a coiled torsion spring 252 is secured to the back of disk 249b and to a bar 253 forming part of the motor and magnet frame, which frame also carries the clutch. Disk 249b is carried by a shaft 254 to which is secured a pulley 255. A belt 256 illustrated as of cylindrical cross section is secured at one end by a small screw 257 to pulley 255, the same extending partially around said pulley and then around a pulley 258 carried on a shaft 259 suitably supported in casing 230 and around a similar pulley 260 carried on a shaft 261 supported in casing 230, said belt then again passing to pulley 255 and having its other end secured to said pulley by a small screw 262. The winding of the electromagnet 250 will be in circuit with the printing lamp 107. Belt 256 is connected to the member 240. From the described structure it will be seen that when electromagnet 250 is actuated lever 251 will engage the disks of clutch 249 so that pulley 255 will be driven. Belt 256 will be driven and the same will travel around pulleys 258 and 260 so that the pointer member 240 will travel across bar 238 above the openings 234a. When electromagnet 250 is deenergized the clutch disks 249a and 249b are separated and spring 252 will rotate disk 249b and pulley 255 so that the belt 256 will be moved and the pointer 240 will be moved back to its position at the left as seen in Fig. 31. A switch box or casing 270 is carried on one side of the machine as shown in Fig. 3 and a main switch 271 has an operating handle projecting through an aperture in said casing. A small ruby lamp 272 is mounted on said switch casing above switch 271. A conductor 273 is shown extending from switch casing 270 to the small ruby lamp in casing 225. A conductor 274 extends from switch casing 270 to the lamp box casing 101. A conductor 275 extends from casing 230 and lamp socket 236 to the lamp box casing 101. Another conductor 278 extends from the lamp box casing to the motor casing 56d and motor 57. The power line for the machine can either enter the lamp box casing 101 or be brought into switch box 270.

The machine has a series of shelves 280 illustrated as three in number extending horizontally at one side thereof beneath table 52 and supported upon vertical bars 281 secured at their upper ends to table 52 and a channel member 282 extending across the same. Drawers 283 are adapted to be disposed on the shelves 280, the same having handles 283a on their front ends. A shelf 284 is formed at the right side of the machine, the same sloping downwardly and forwardly at an angle of substantially 45 degrees and having an upwardly and forwardly extending portion 284a at its lower end. The shelf 284 is adapted to support one of the drawers 283, which drawers as shown in Fig. 1, are provided with a plurality of compartments 283b and are also provided with a cover 283c. Beneath shelf 284 the machine is provided with a plurality of vertically extending compartments 285 divided by vertical partitions 286. Forwardly of the foremost partition 286 the machine is provided with a plurality of compartments 287 formed by partitions 288 having rounded forward corners.

Figure 32:
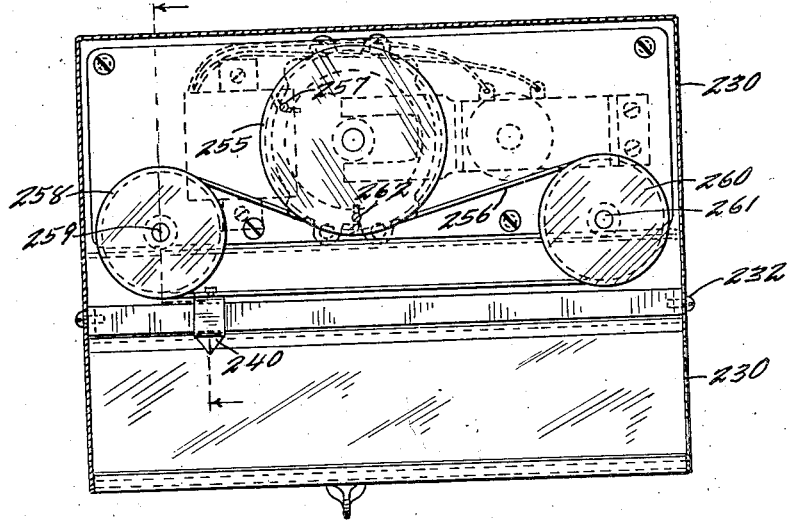
Fig. 32 is a plan view showing an exposure guide device, the enclosing casing being shown in horizontal section.
Figure 33:
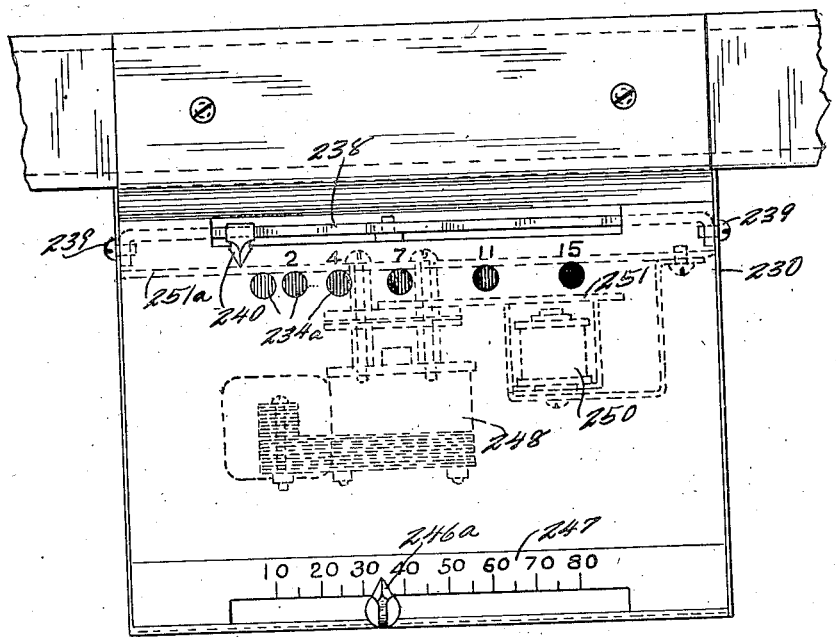
Fig. 33 is a view in front elevation of the exposure guide device.

In operating the machine the main switch 271 is moved to closed position and this starts the motor 57, lights the index lamp 226 and lights the pilot light 107u. The function of the pilot light is to furnish sufficient light for the operator to place the negative over the light opening 95a. It will be understood that the machine will be operated in a dark room. The operator now takes the negative to be printed and selects the proper mask 170 to give the desired enlargement or the desired size of print. It will be understood that at this time the platen is in its rearward position shown in dotted lines in Fig. 7. The mask is quickly placed in the mask holder by placing the front end of the same beneath clips 106a and beneath the same, the rear end of the mask then being moved between lugs 166e and into the slots 166f. The operator now presses laterally on the downturned portion 120b of lever 120, thus lifting negative holder 115. This holder is thus free for rotation and is quickly turned to bring the desired opening 115a in forward position. A negative is placed beneath the opening 115a and lever 120 is released. Plate 115 then descends holding the negative firmly on the top of plate 95. The operator now turns index member 223 to bring the number at the top and bottom thereof which corresponds to the number of the mask selected in the forward position of said index. If as shown in Fig. 10, the mask numbered 6½ has been selected, this number will be brought forward on the index. The operator now grasps handle 150 and moves the paper carriage and pointer 225 to bring the pointer opposite the letter designating the opening 115e beneath which the negative has been placed. If necessary at this time, hand wheel 153 may be operated to position pointer 225a. This however, is not usually necessary. As previously described, movement of the paper carriage 150 through the connection thereof with the lens carriage moves the lens carriage. This is accomplished through the connection with the lever 155 and the cam plate 159. The lens unit 133 is now in proper position to give the desired magnification of the image. The inter-connection between the paper carriage 149 and the lens carriage 132 is so designed that the lens unit 133 is always brought to proper position so that the projected image will fill the mask opening when pointer 225a registers with the letter on the index guide 223. At this time the switch 108 for the printing lamp is open and bar 112 is in its raised position with the notch 112a engaged with plate 63. The paper is now placed in position. The operator now presses on the trigger plate 86. This through arm 84, raises the plate 81, bringing the lower clutch plate 70 into engagement with upper clutch plate 69. The clutch is now engaged and rollers 83 have been raised out of the slots 56a and rotate about on the top of plate 56. When the lower plate 70 begins its movement arm 73 is rotated and this, through the link 74, rotates the arm 75. As above described, this rotates shafts 73 and 127 as well as shaft 165. The platen holder 172 is now swung down to paper holding position and platen plate 171 is yieldingly pressed against the paper. At the same time the printing member 200 is pressed against the paper on the non-emulsion side and the identifying character is printed on the paper. This character is usually the same for all of the prints on the particular order. This number of course, may vary as directed by the customer. As the platen reaches its position on the paper plate 81 has revolved into position to bring projection 83a into engagement with block 112b on bar 112. This disengages notch 112a from plate 63 and said bar drops, thus closing switch 108. The closing of switch 108 lights the printing lamp 107, lights the lamp 235 in the exposure guide housing, actuates electromagnet 250 and starts the motor 248 so that pointer 240 starts to travel along the openings 234a. As shaft 127 rotated during the operating of the platen block 120 was rotated and this, through belt 125a, rotated pulley 125, thus moving crank rod 124 and lowering curtain 123 to its closed position. Curtain 123 thus closed the opening of casing 122 before the printing lamp was lighted. When the printing lamp is lighted the image as stated, is sharply focused on the printing paper. This image is reflected in mirror 233, which as shown in Fig. 1, is in view of the operator. The operator glances at said image and picks out a portion thereof which will determine the printing period. Every negative has certain contrasting parts therein and an experienced operator in looking at the negative can and does pick out some portion thereof which will determine the density of the print to be made or the time of exposure. Having selected the said portion of the image the operator then selects the opening 234a which most nearly corresponds to the density of the selected portion. If the selected portion is very dark then the opening at the right as shown in Figs. 32, and which is numbered 16 would be selected. If a lighter portion has been selected, perhaps slot or opening 7 would be selected. The openings 234a in effect form spots. The spots are designated by numerals in Figs. 1 and 32. This is not absolutely necessary but the numerals indicate the multiple of density of the particular spot in relation to the spot marked 1. In other words, the spot marked 2 is twice the density of the spot marked 1 and the spot marked 4 is twice the density of the spot marked 2. If desired, the spots would be arranged in a regular geometrical series of density. In practice, the pointer travels from the first spot to the last in about 20 seconds. The printing period will, of course, vary with the kind of printing paper used. In the common practice in the art, printing papers of different speeds are used. To adjust the exposure guide for different print papers the pointer 246a is provided with the resistance 242. If a very fast paper is used, the pointer 246a will be adjusted to cut in resistance so that the lamp 235 will be dimmed and all of the density spots in openings 234a will be darkened. If a slow paper is to be used resistance will be cut out so that all of the density spots will be lightened in color. The indications on the scale 247 indicate different papers and pointer 246a will be placed in registry with the number designating the paper used at any particular time. As soon as the pointer 240 has reached the selected spot or opening the print will be finished and the operator then again steps on trigger plate 86. When the trigger plate is again pressed upon, the bar 112 will be raised and the printing lamp will be extinguished by the opening of the switch 108. It may be here pointed out that the trigger plate has two functions. One is to connect the clutch plates 69 and 70 and the other is to control the printing lamp after the printing operation. It is some times desired to doctor a print by giving one portion a little more exposure. An operator often does this by placing her hand or an instrument over a portion of a print or between the lens and the paper. This is a well known operation and can be done very quickly by an experienced operator. The operator may therefore, raise and lower trigger plate 86 several times quickly to light and extinguish lamp 107 before pressing the trigger plate down far enough to again operate the clutch. If no doctoring is to be done on the print the operator merely presses the trigger plate down all the way and this raises plate 81 and again operates the half revolution clutch comprising plates 69 and 70. When the clutch is engaged it makes a half revolution and arm 73 is again rotated, which through the mechanism described, operates shaft 127 and also as above described shaft 165 is operated. This raises the mask carrier and platen together lifting the print and discharging it rearwardly. As above described, the mark carrier is returned to print receiving position and the platen remains in its rearward position. The print slides from the platen against panel 218 and then drops onto deflecting plate 219 and is guided into tray 220. The operation is quite rapid and the making of prints is only a matter of seconds. The lighting system illustrated is that using a projection lamp and condenser lenses which are the lenses 93 and 93a. As stated, these are plano-convex lenses. The lens 93a directs the rays in substantially straight lines against mirror 98 by which they are reflected upwardly into lens 93 which focuses the rays for direction into the lens unit 133. The projection lamp is extinguished a sufficient time before the print is raised for discharge that no difficulty is experienced with afterglow from the lamp. The operator can make a quick adjustment of the iris or diaphragm if this is necessary to suit the particular negative by merely swinging arm 134 to the desired position.

The lamp box is ingeniously made for easy access and cleaning. When the hinge side 97 is swung downwardly the lenses 93 and 93a may be cleaned or polished as can also the mirror 98 and access can be had into the casing 101 if desired. The rear side of the lamp box casing 101 is removable as indicated by the dotted lines in Fig. 30. This gives easy access to the inside of the casing and lamp bulbs 107 and 107a may be replaced when necessary. Easy access is thus also had to the switch 108. It is necessary to accurately position the printing lamp 107 relatively to lens 93a. The bulbs used may be of different sizes and the filaments vary in different bulbs. Rod 106 is slidable frictionally through ball 106a and this movement, together with the universal movement possible with ball 106a in the plate 105 gives all the necessary adjustment. The ball 106a is made in half sections which are clamped on rod 106 by bolts 103 and the nuts 102a. One section has a hole for rod 106 extending centrally therethrough while the other section has the hole for rod 106 extending to an acute angle to the flat side thereof. The adjacent flat surfaces are then at an angle to each other. When the sections are clamped together by nuts 103a the ball exerts a pinching effect on rod 106 thus holding the same and lamp 107 firmly in adjusted position.

The lamp box is ventilated to prevent excessive heating by cool air entering through the opening 101c and passing around the partition carried on brackets 102 as shown in Figs. 7 and 30. This partition forms a sort of a flue at the bottom and side of the box and the cool air then passes into opening 101j and into the flue 101k which extends to the top of the machine. There is enough height to the flue to get a good draft and the ventilating is quite effective.

The masks used can conveniently be kept in the compartments 285. The work order envelopes containing the films for each order can conveniently be placed in the compartments 287. The drawers 283 contain the print paper and paper of different speeds will be contained in the compartments 283b. The drawers can be conveniently positioned on the shelf 284 so that the paper is within easy reach of the operator. Another important feature of the machine is the trough formed in the rear of flange 52c. As the work is finished on each negative the operator can merely push the negatives forwardly so that they drop into said trough. When the particular order is finished the operator can reach into the trough with the thumb and finger through the opening 52d and grasp the pile of negatives between the thumb and finger so that they can be easily and quickly removed as a group. This adds to the rapidity of the operation.

The machine as described, is adapted to produce various standard sized paper prints from one size negative. This can be done by using the various masks provided and making the necessary adjustment on the index for the masks.

The machine can be used to produce various standard sized paper prints from different sized negatives. For instance, the prints can be made in such standard sizes as 4 by 6 inches, 5 by 7 inches and 6½ by 8½ inches by selecting the masks for those standard sizes and then using the different sizes of negatives in the proper holders or openings in the negative holder. If only one standard size of print is desired, the mask corresponding to that size would be used with the different sized negatives.

The machine can also be used to produce single sized prints from one negative with various magnifications. For instance, a certain mask, say a 4 by 6 mask, would be selected. The negative then could be enlarged to include all of the subject matter to cover the 4 by 6 print or only a small part of the negative could be used to fill the 4 by 6 print. The hand wheel 153 may be turned somewhat to move the paper carriage upwardly a short distance and this increases the magnification of the central part of the negative. This procedure is frequently desirable to eliminate some uninteresting subject matter about the edges of a negative.

The machine can also be used to produce single sized prints from different sized negatives. In this case only one size paper mask would be used and the different sized negatives would be placed under the different openings 115a. As each opening is brought over opening 95a, the paper and lens carriage would be adjusted to the proper letter.

The machine can also be used to produce prints with wide margins of different widths. This can be done by using a piece of paper larger than the image desired and using a mask which covers a large part of the paper about the edges thereof.

The negative holder holds each negative in the exact center of illumination. The negative holder being operated by the knee-operated lever leaves the hands of the operator free for other uses.

From the above description it will be seen that I have provided a very efficient and compact machine by means of which enlargements or oversized prints can be made with great ease and speed. The machine has been amply demonstrated in actual practice and found to be very successful and efficient. It is being put into commercial production.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A print making machine having in combination, a member having a substantially horizontal surface on which a print is supported, said member being swingable to and from print supporting position, a platen for holding a print on said member and mounted for swinging movement with said member, means for swinging said member, print and platen upwardly together and to a position past the vertical and then onward past the horizontal and means for then releasing said member and moving it back to its print supporting position whereby said member and platen are separated, said print is released and will be discharged.

2. A print making machine having in combination, a member having a substantially horizontal surface on which a print is supported, said member being swingably mounted about an axis at the rear thereof to swing upwardly and rearwardly, a platen adapted to hold a print on said member and being swingable about said axis with said member, means for swinging said member and platen upwardly and rearwardly together with a print therebetween and to a position past the horizontal, means for releasing said member and swinging it back to print receiving position whereby said print will be released and will be discharged rearwardly in position with its face upward.

3. A print making machine having in combination, a member having a substantially horizontal surface on which a print is supported, said member being swingably mounted about an axis at the rear thereof to swing upwardly and rearwardly, a platen adapted to hold a print on said member and being swingable about said axis with said member, means for swinging said platen to hold a print against said member, means for swinging said member and platen upwardly and rearwardly together with a print therebetween through an angle of over 180 degrees, means for returning said member to print receiving position thus separating the same and said platen and discharging said print, a print receiving receptacle and means for guiding said print into said receptacle.

4. A photographic projection printer having in combination, a mask carrier, a mask held in said carrier, a platen carrier, a platen carried by said carrier adapted to engage a piece of printing paper overlying said mask and means for raising said mask and mask carrier with said platen thereagainst and moving the same to bring said platent into a rearwardly sloping position and subsequently separating said platen from said mask and mask carrier to free said print and discharge the same by gravity.

5. The structure set forth in claim 4, said platen being yieldingly supported in said platen carrier to give a resilient pressure against said printing paper.

6. A photographic projection printer having in combination, a mask carrier, means on said carrier for engaging and detachably holding a mask and a platen swingable relatively to said mask and carrier for engaging a piece of printing paper on said mask and means carrying said platen comprising resilient means above and engaging said platen permitting yielding movement of said platen upwardly when the latter engages said mask.

7. A photographic projection printer having in combination, a member having a flat surface adapted to receive a piece of printing paper in substantially horizontal position, a second member constructed and arranged resiliently to press said paper against said member for the printing operation and means for swinging said members upwardly past the vertical and then separating said members, means for returning said first mentioned member to print receiving position, said second member being moved to a position past the horizontal so that said print will slide therefrom rearwardly and downwardly.

8. A photographic projection printer having in combination, an oscillatable shaft, a member for receiving and supporting a piece of printing paper in a substantially horizontal plane, means connecting said member to said shaft including a clutch, a platen movable to engage said paper and press it against said member during the printing operation, means connecting said platen to said shaft, means for oscillating said shaft to raise said member and platen with said paper therebetween to a position past the vertical and means for subsequently operating said clutch to release said first mentioned member and allow it to return to print-receiving position, said platen being moved by said shaft to a position beyond the horizontal so that said print will slide downwardly therefrom.

9. A photographic projection printer having in combination, an oscillatable shaft, a member for receiving and supporting a piece of printing paper in a substantially horizontal plane, means connecting said member to said shaft including a clutch, means for raising said member after the printing operation, means for operating said clutch to release said member, means for returning said member to print-receiving position and means for causing said member to return gently to said position.

10. A photographic projection printer having in combination, a member adapted to receive a piece of printing paper, in a substantially horizontal position, a second member constructed and arranged to resilient press said piece of paper against said member during the printing operation, an oscillatable shaft, means connecting said members to said shaft including a clutch connecting said first mentioned member to said shaft, means for oscillating said shaft after the printing operation to raise said members, means for subsequetly operating said clutch to release said first mentioned member, means causing said first mentioned member to swing back to print-receiving position, an arm yieldingly carried by said member and a member engaged by said arm causing movement of said arm to cause said first mentioned member to come gently to print-receiving position.

11. A photographic projection printer having in combination, a member adapted to receive a piece of printing paper in a substantially horizontal plane, a second member constructed and arranged to resiliently press said piece of paper against said member during the printing operation, an oscillatable shaft, means connecting said members to said shaft including a clutch for connecting said first mentioned member to said shaft, means for oscillating said shaft after the printing operation to raise said members, means for subsequently operating said clutch to release said first mentioned member, means for returning said first mentioned member to a print-receiving position and means for varying the time of operation of said clutch.

12. A machine for making photographic prints having in combination, a member on which a piece of print paper is supported in printing position, a light means for printing said piece to form a print, means for holding said print on said member and means for moving said member and means together with said print therebetween to lift said print, turn it over and then separate said members and discharge said print.

13. A machine for making photographic prints having in combination, a member for supporting a piece of print paper in substantially horizontal position with its printing face downward, a second member engaging said paper and holding it against said first mentioned member, a light means for printing said paper to form a print, means for swinging said members after said printing operation to lift said print, turn it over, separate said members and move said second mentioned member past a horizontal position so that said print will be discharged therefrom printed face upward.

14. A machine for making photographic prints having in combination, a member for supporting the print paper in substantially horizontal printing position, a platen for engaging said paper to hold the same down on said first mentioned member in printed position printing face downward, a light means beneath said member for printing said paper, a receptacle at the rear side of said member for receiving prints and means for rotating said member and platen about a transverse axis at the rear side thereof to lift said print while held therebetween and move it to a position past the vertical, means for releasing said member and for returning it to print supporting position, said platen being continued in movement to a position past the horizontal so that said print is discharged therefrom edgewise and face upward into said receptacle.

GLEN M. DYE.